April 6, 1965     K. H. BURZLAFF ETAL     3,176,975

SURGICAL TABLE

Filed Sept. 19, 1960     14 Sheets-Sheet 1

INVENTORS.
KARL H. BURZLAFF
EGON R. WEICKGENANNT
GEORGE E. MARTIN

BY *Thunson & Roemel*

ATTORNEYS

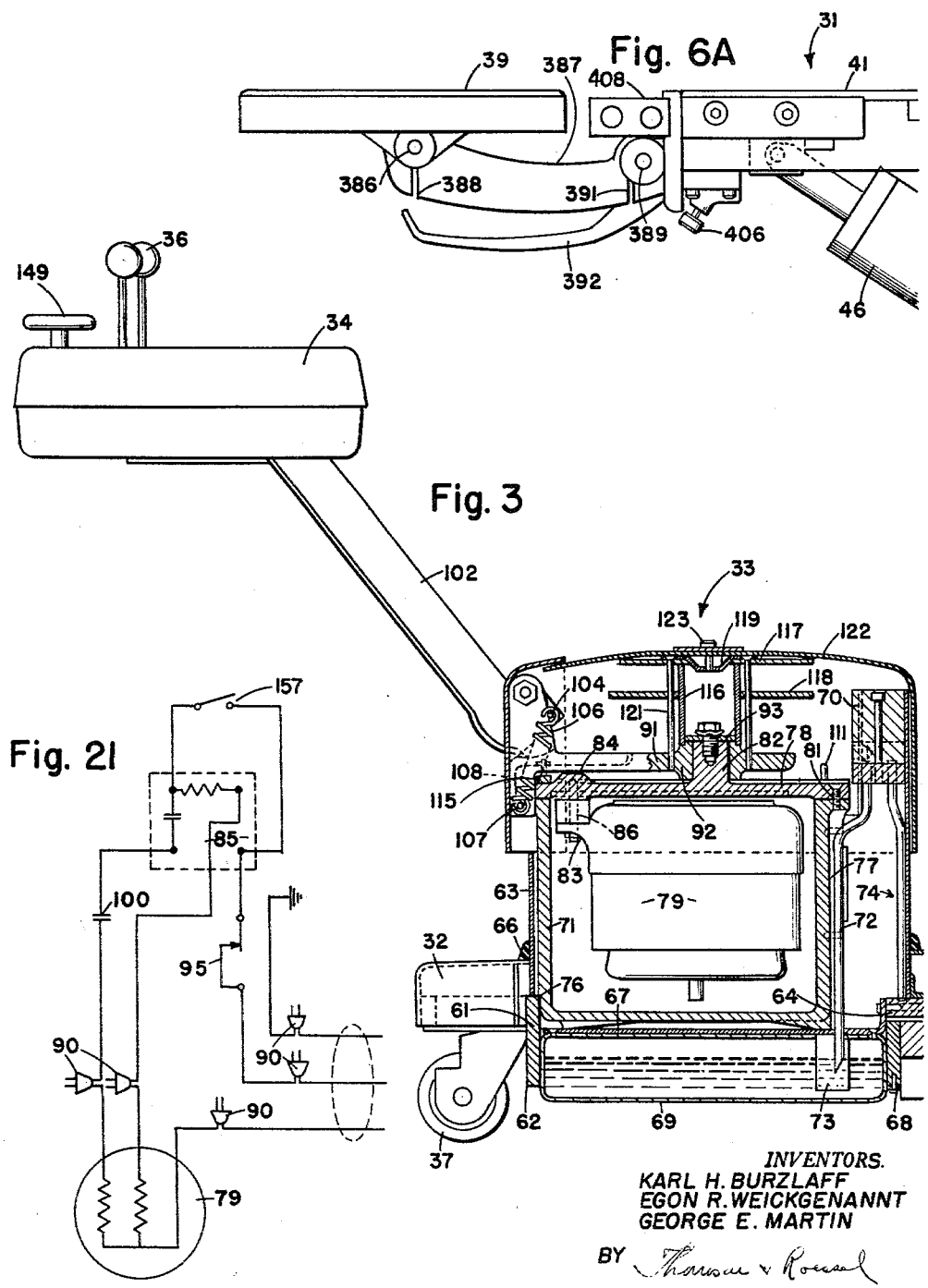

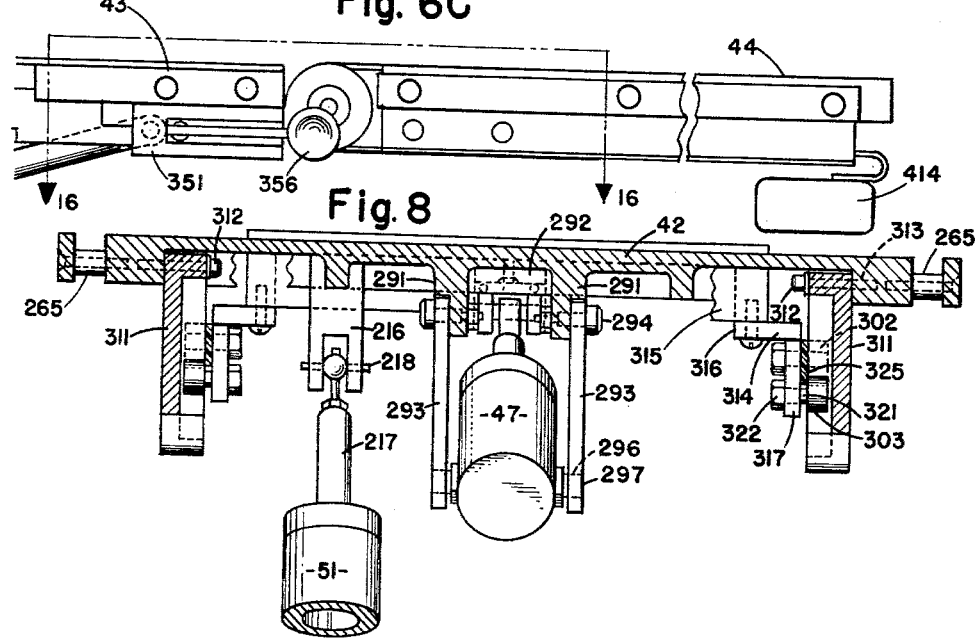
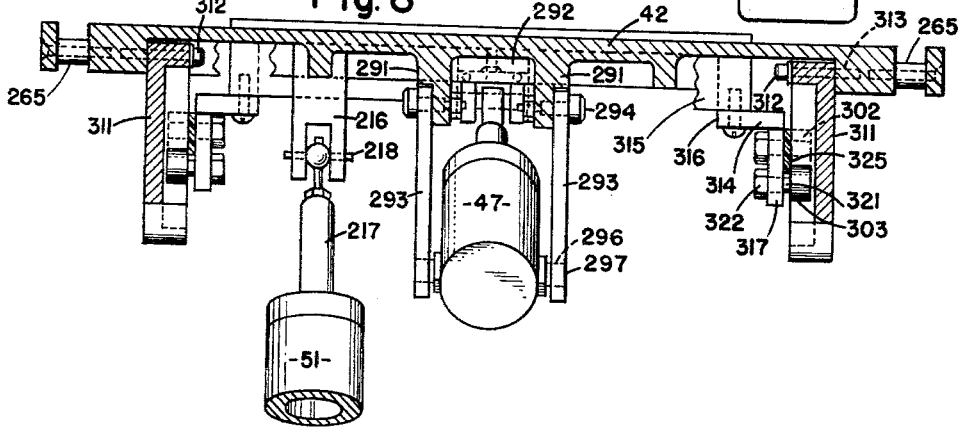
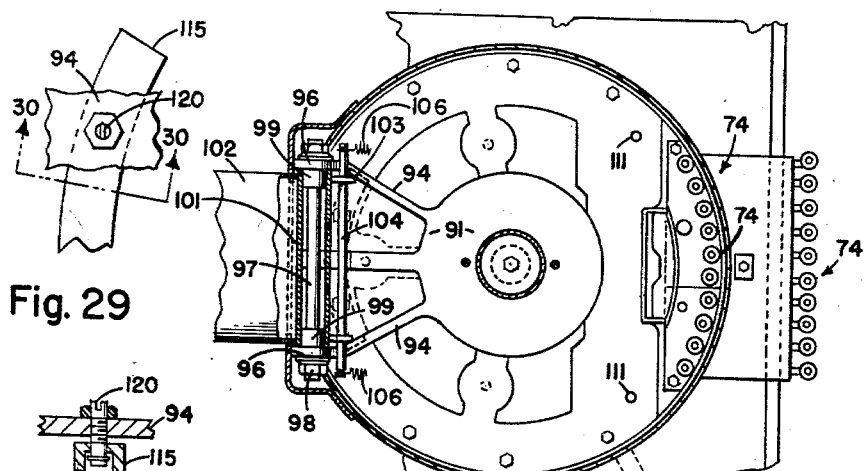
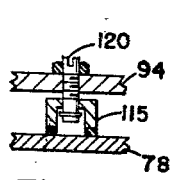

April 6, 1965 K. H. BURZLAFF ETAL 3,176,975
SURGICAL TABLE

Filed Sept. 19, 1960 14 Sheets-Sheet 4

INVENTORS.
KARL H. BURZLAFF
EGON R. WEICKGENANNT
GEORGE E. MARTIN
BY
ATTORNEYS

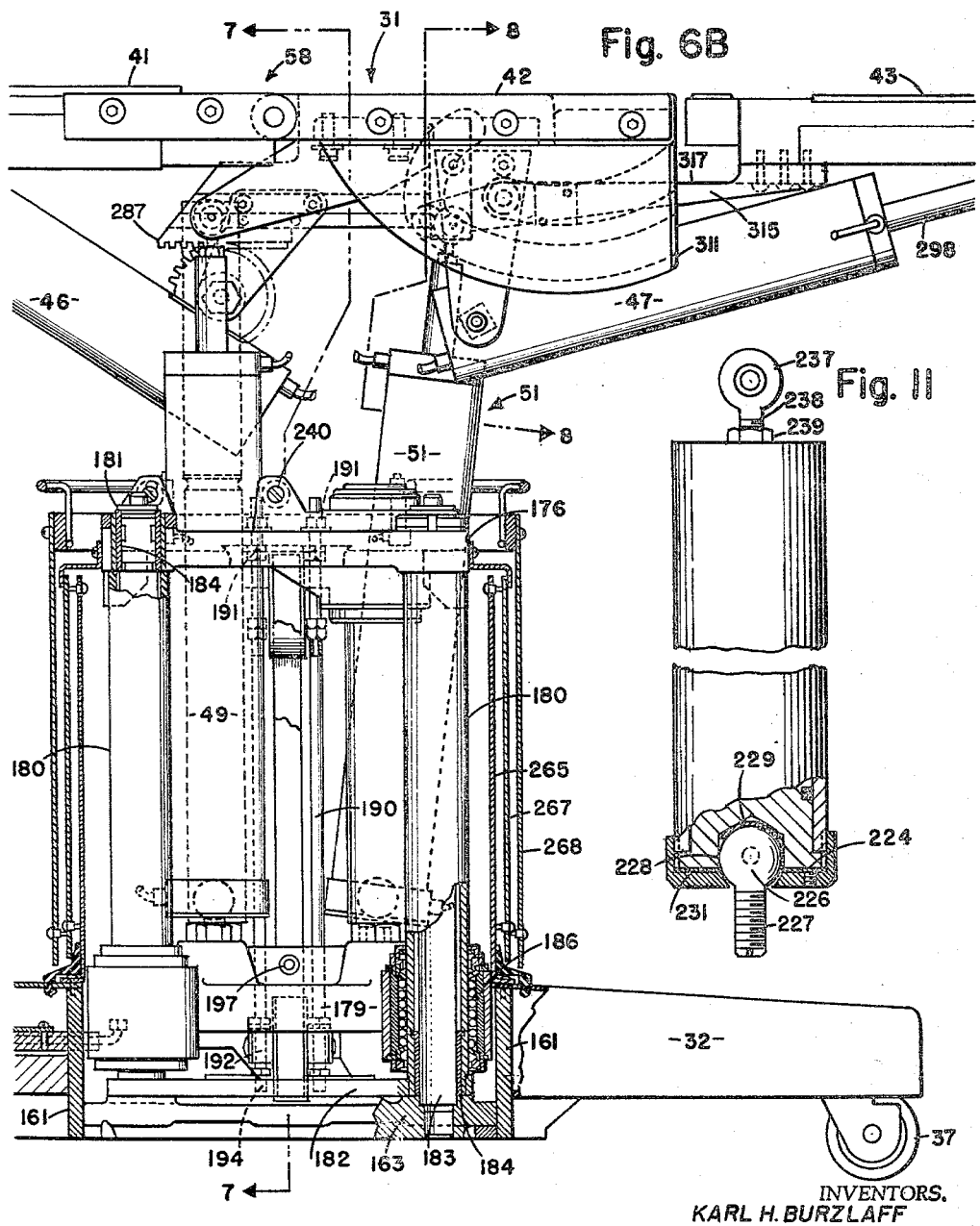

April 6, 1965   K. H. BURZLAFF ETAL   3,176,975
SURGICAL TABLE
Filed Sept. 19, 1960   14 Sheets-Sheet 6

INVENTORS.
KARL H. BURZLAFF
EGON R. WEICKGENANNT
GEORGE E. MARTIN
BY
ATTORNEYS

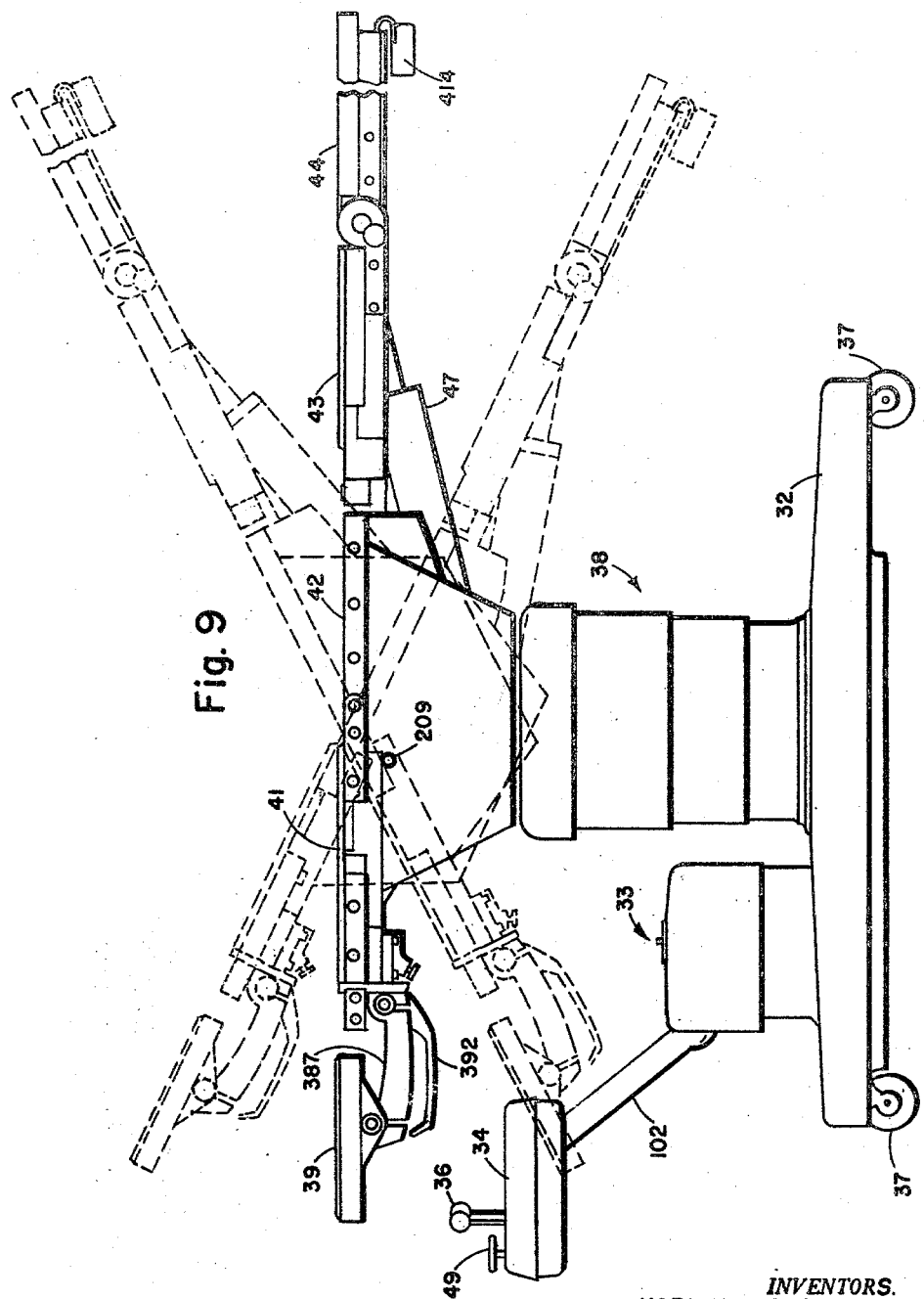

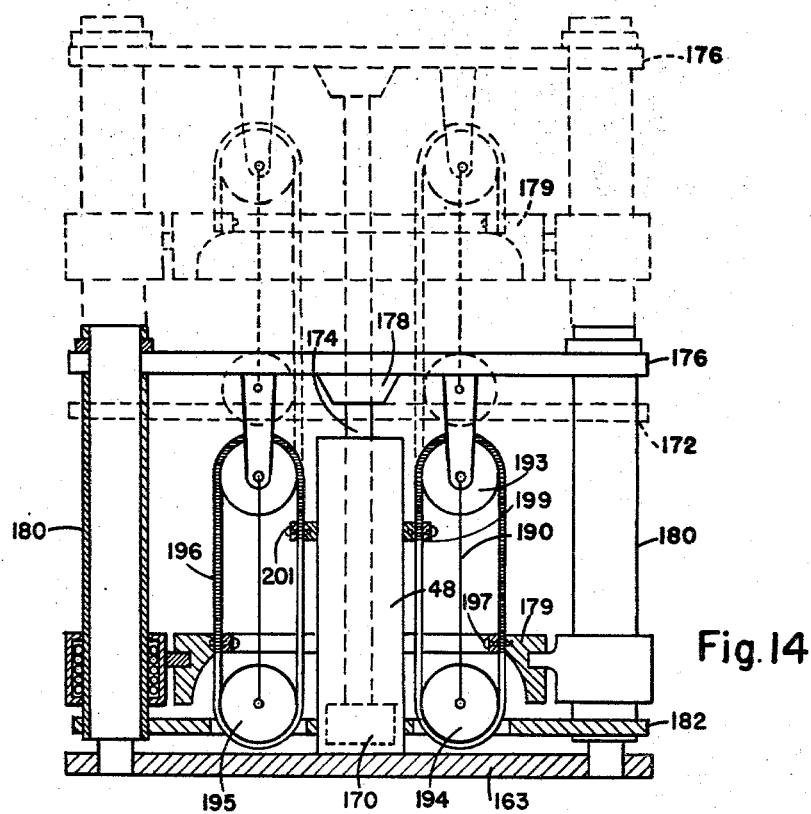
Fig. 14
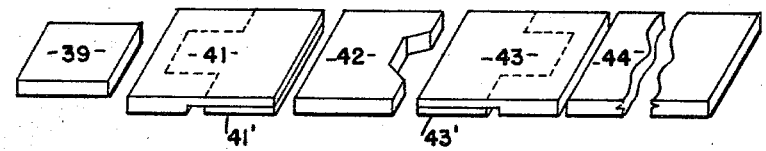
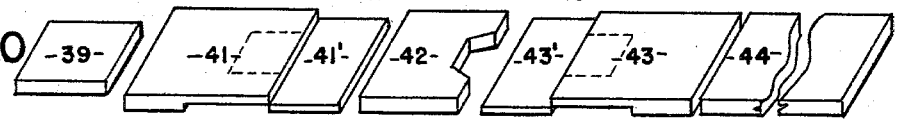
INVENTORS.
KARL H. BURZLAFF
EGON R. WEICKGENANNT
GEORGE E. MARTIN
BY Thurman & Rosse
ATTORNEYS April 6, 1965 K. H. BURZLAFF ETAL 3,176,975
SURGICAL TABLE
Filed Sept. 19, 1960 14 Sheets-Sheet 11

INVENTORS.
KARL H. BURZLAFF
EGON R. WEICKGENANNT
GEORGE E. MARTIN
BY
ATTORNEYS

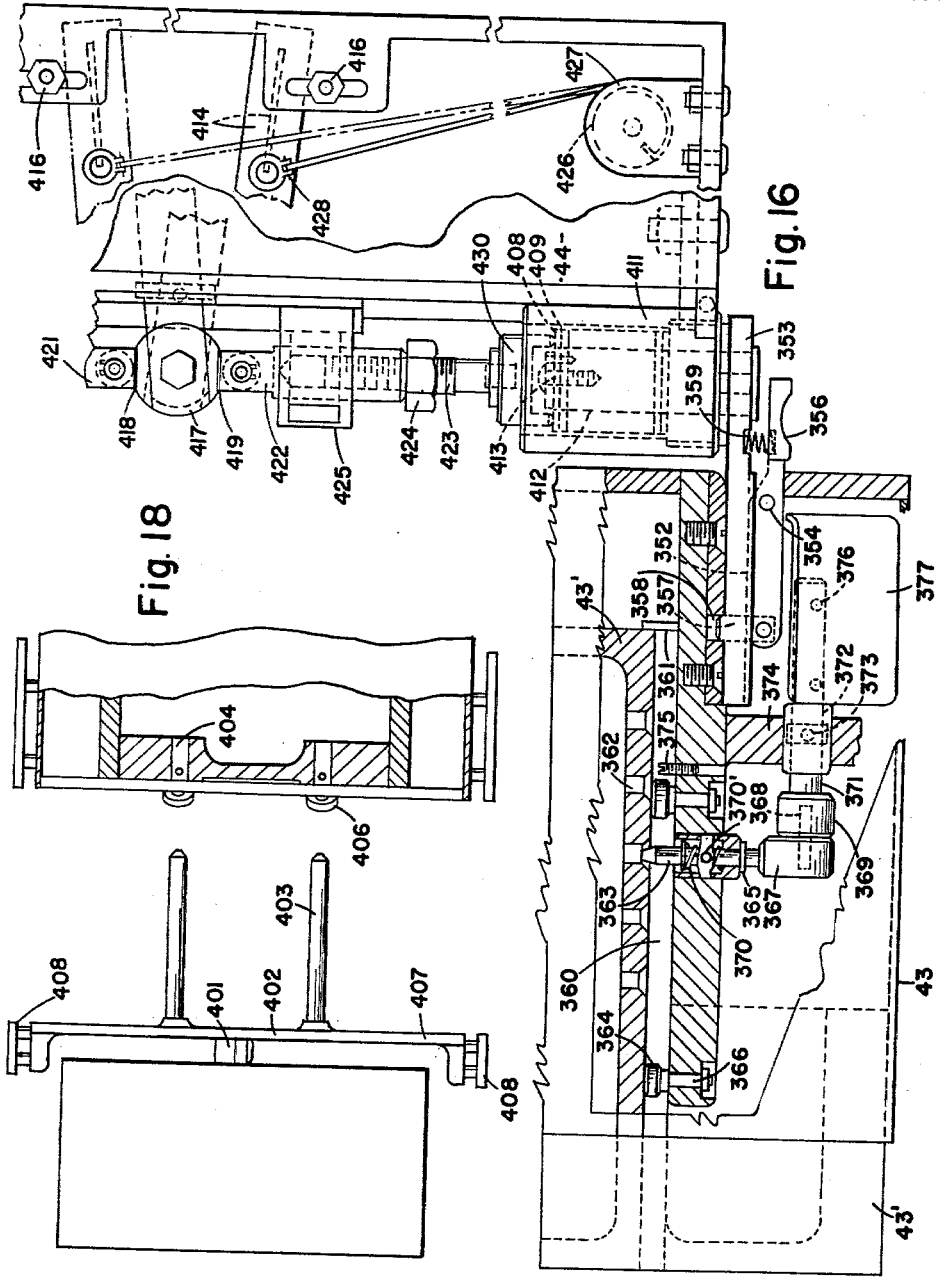

April 6, 1965

K. H. BURZLAFF ETAL 3,176,975

SURGICAL TABLE

Filed Sept. 19, 1960

INVENTORS.
KARL H. BURZLAFF
EGON R. WEICKGENANNT
BY GEORGE E. MARTIN

*Thurman & Roessel*

ATTORNEYS

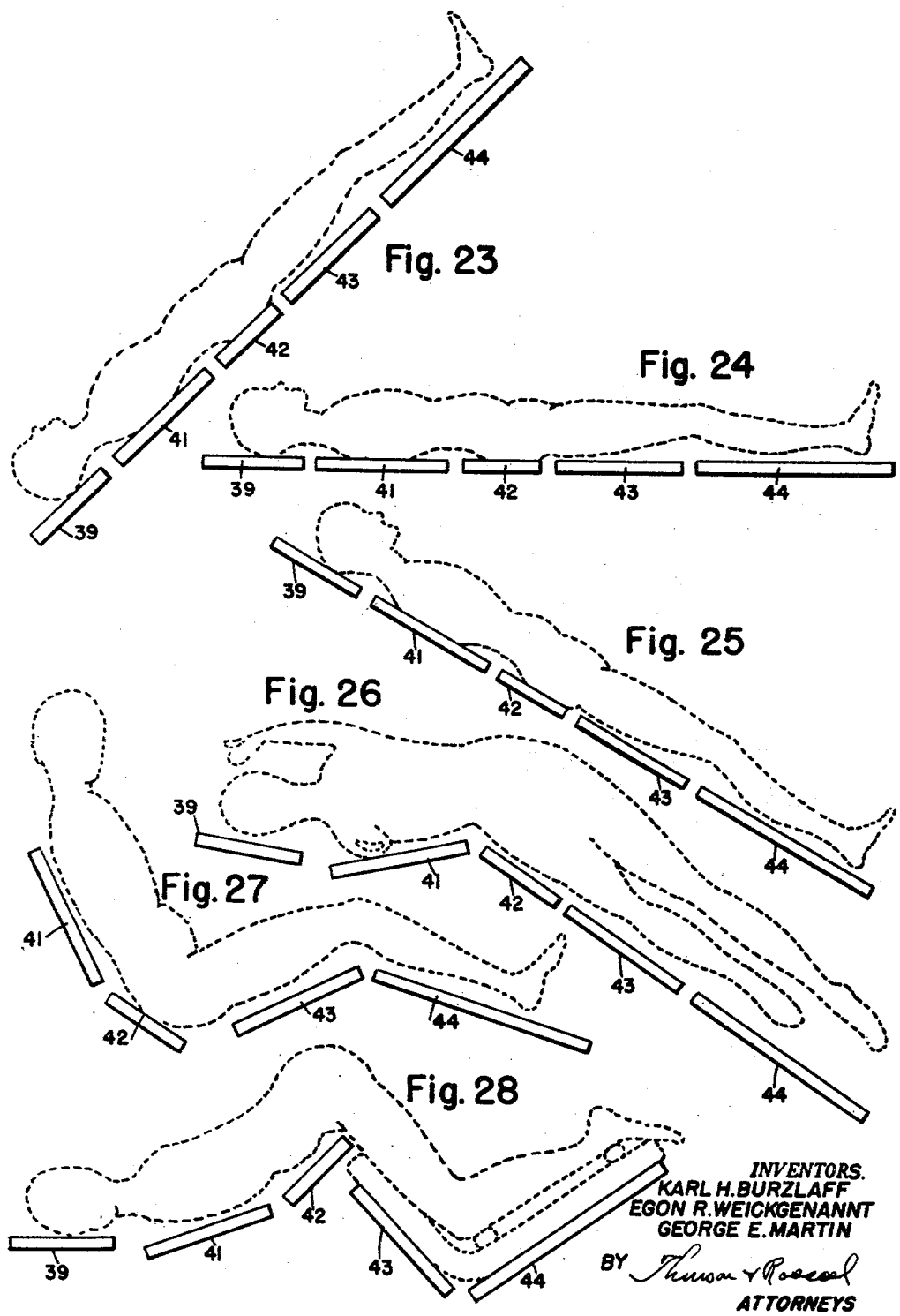

United States Patent Office 3,176,975
Patented Apr. 6, 1965

3,176,975
SURGICAL TABLE
Karl H. Burzlaff, Fairport, Egon R. Weickgenannt, Rochester, and George E. Martin, Scotia, N.Y., assignors to Ritter Company, Inc., Rochester, N.Y., a corporation of Delaware
Filed Sept. 19, 1960, Ser. No. 56,803
23 Claims. (Cl. 269—325)

This invention relates to a surgical table.

The object of any medical treatment, employed for surgical intervention, is to insure optimum welfare of the patient with minimum operative risk. To achieve this, the skill of the surgeon and his team must be complemented by adequate equipment. The table of this invention has been designed after study of a great many and a great variety of operations to provide a more nearly universal table affording the patient the maximum in comfort and his operating team the maximum in convenience and access to the portion of the patient to be surgically operated upon.

Primitive surgery was accomplished on a conventional wooden table or such other furniture as happened to be available. As the surgical profession has developed techniques for successful surgical intervention to solve an ever-increasing number of pathological and physiological problems, operating tables have been improved in an attempt to provide the greatest possible assistance to the surgeon and his surgical team.

Many of the major surgery tables, presently available, are sectional and usually one or more sections are individually adjustable to support the patient in the position that is most convenient to the surgeon for the operation that is to be performed. Not all of the table sections need, or are provided with, the same amount of adjustability. To permit adjustment of a major surgery table for elevation, Trendelenburg, and lateral tilt, and to permit adjustment of any of the individual sections, a relatively large number of different controls must be provided, and various cranks, wheels, and levers are provided for this purpose. Usually these controls are located beneath the level of the table top and, in some tables, some of the controls are located adjacent to the head of the table, for convenient access by the anesthetist.

Many of the levers and cranks project beyond the outline of the table top itself, either of necessity because of structural requirements, or in order to make them accessible. Unfortunately, however, these projecting parts often interfere with the movements of the surgical operating team, and in some cases, the control mechanisms and their associated parts interfere with the surgeon for certain operating positions, or restrict access to the patient. Moreover, because they project beyond the table top for accessibility the surgeon or members of his team bump into them resulting in painful bruises.

One object of this invention is to provide a supporting and adjusting system for a surgery table and operating controls for the system that permit a wide range of adjustability of the table sections and that do not present hazards or nuisances to the surgical operating team.

An important object of the invention is to provide a surgical table in which most of the major adjustments of the table are accomplished by power as, for example, hydraulically operated to avoid the manual effort required to raise sections of the table with the weight of the patient thereon.

Another object of the invention is to provide controls for the adjustment of the positions of a surgery table and sections thereof that have a high degree of accessibility and that are out of the way of the surgical team.

A more general object of the invention is to provide, in a major surgery table, an arrangement of the table base, superstructure and controls which permit the greatest degree of freedom of access to the patient by the surgery team, coupled with convenience of access to the controls by the appropriate member, usually the anesthetist, of the surgical team.

A related object of the invention is to provide a sectional major surgery table, in which the supporting and adjusting system for the table sections is power-operated, and in which the controls are located at one end of the table and are mounted in such a way as to offer maximum accessibility to the controls by the appropriate member of the surgical team.

Another related object of the invention is to provide a control system, in a table of the character described, that permits the anesthetist to move the controls as a unit to the most convenient location for each particular type of operation and which permits the anesthetist to have full use of the controls without interfering with the rest of the operating team.

Still another object of the invention is to provide a surgery table that is free of obstructing objects, such as clamps, locks, and control handles projecting beyond the edges of the table which restrict access to the patient.

Another object of the invention is to provide a surgery table that provides adequate knee room beneath the table perimeter for the surgeon in those operative procedures during which the surgeon is or can be seated.

A further object of the invention is to provide supporting and adjusting system for a surgery table that permits adjustment of the table to a great many operative positions while the patient is on the table without requiring manual lifting of the patient and with a minimum of danger to the patient.

The invention further contemplates a surgical table in which the controls for shifting the various sections relative to each other; raising and lowering the table as a whole; tilting the table about a transverse axis; and tilting the table about a longitudinal axis are located in a single control box mounted upon an arm swingable about a vertical axis and also preferably pivotal about a horizontal axis to enable the control box to be positioned so that all major functions of the table may be controlled from a central point, usually by the anesthetist, with the control box being positioned, as desired, to interfere as little as possible with the movements of the surgical team about the table in performing their various duties.

Other objects and advantages of this invention will be particularly set forth in the claims and will be apparent from the following description, when taken in connection with the accompanying drawings, in which:

FIG. 3 is a fragmentary side view, partly in section of the control assembly mounted on the base of the surgical table;

FIG. 4 is a view, partly in section, taken substantially on the line 4—4 of FIG. 2 in the direction indicated by the arrows;

FIGS. 6A, 6B and 6C are views which should be taken together and are enlarged views of FIG. 2 showing the table in side elevation;

FIG. 8 is a sectional view taken substantially on the line 8—8 of FIG. 6B in the direction indicated by the arrows;

FIG. 9 is a side elevation of the table partly diagrammatic showing the Trendelenburg and reverse Trendelenburg positions to which the table may be swung about a horizontal transverse axis;

FIG. 11 is a view of either the Trendelenburg or lateral tilt cylinder with parts broken away for clearer illustration;

FIG. 14 is a diagrammatic view partly in section showing the means for raising and lowering the cage which carries the platform upon which the fixed pivot and the lateral tilt and Trendelenburg cylinders are carried;

FIG. 16 is a bottom view, partially in section, of the underside of the fixed and movable femoral sections, the foot rest section and showing the means for adjusting the length of the femoral section and the locking means for the foot rest section;

FIG. 17 is a top plan view of the head rest section showing the means by which it is carried by or supported from the spinal section and illustrating how it may be extended and removed;

FIG. 18 is a sectional view showing the head end of the spinal section and showing the means for receiving the head rest section;

FIG. 19 is a diagrammatic view showing the five sections of the table with the adjustable spinal section and the adjustable femoral section closed so that these sections are at their minimum length;

FIG. 20 is a view similar to FIG. 19 and diagrammatically illustrates how the spinal section and the femoral section may be extended, the position of the parts showing, with the exception of the extension of the head rest section, the maximum length of the table;

FIG. 21 is a diagrammatic wiring diagram for the motor circuit;

FIG. 22 is a complete hydraulic diagram used in controlling the table and the sections thereof;

FIGS. 23 to FIG. 28 are merely illustrative of six of the many possible positions into which the table sections can be shifted for performing various surgical operations, FIG. 29 is a top plan view of the brake or friction device for the control box arm; and FIG. 30 is a sectional view taken substantially on the line 30—30 of FIG. 29.

Figure 1:
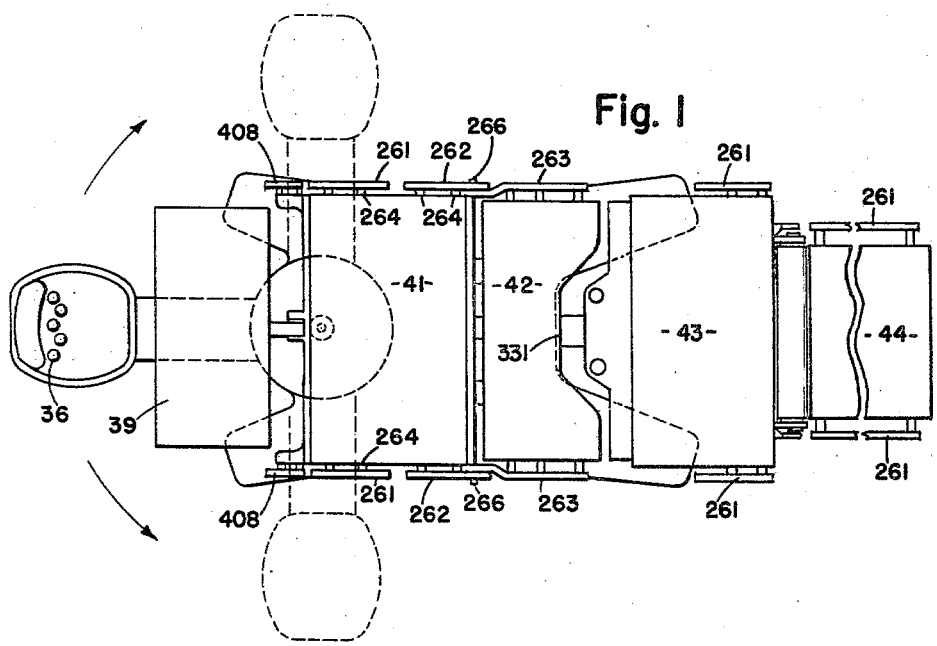
FIG. 1 is a top plan view of a major surgical table constructed according to one embodiment of this invention and showing in dotted lines the two extreme positions to which the arm, on which the hand control box or island is mounted, can be swung.

While the table as a whole will be described generally, the claims of this application will be confined to the hydraulic system, the controls therefor and elements associated therewith. Various other aspects of the surgical table shown and described herein are reserved for separate Patents No. 3,041,120; No. 3,041,121; and No. 3,041,122 and reference is made to such patents for more specific descriptions of the functioning and purposes of the various parts of the table illustrated herein. While a hydraulic system for controlling the various table sections and table movements has been shown, it would be possible to provide electric motors or other motor means for performing all or part of the functions to be described.

The surgical table of this invention comprises a table having a table surface, generally indicated by the numeral 31, for the reception of the patient. The metal table surface is adapted to receive one or more cushions (not shown) for the comfort of the patient. The table includes base 32 from which the table surface is supported; pump and motor housing, generally indicated by the numeral 33; a control box, generally indicated by the numeral 34, which houses the valves for actuating the various hydraulic mechanisms; and a plurality of control handles, in this case five, for separately controlling each of the operations of raising and lowering the various sections with respect to each other, raising and lowering the table surface 31 as a whole and laterally and longitudinally tilting the table. In FIGS. 23 to 28, we have illustrated diagrammatically a few of the more important positions, from a surgical standpoint, in which the patient may be placed.

The base 32 is mounted on four casters 37 which are provided with locking means (not shown) to hold the casters against movement when the table is in use, as shown and particularly described in Karl H. Burzlaff Patent No. 3,055,042 filed December 3, 1958.

A pedestal or support column, generally indicated by the numeral 38, is mounted on the base 32 and, as will be presently more fully described, supports the table or table surface 31. The table comprises five sections a headrest section 39, a spinal or back section 41–41' (see FIG. 19), a pelvic or seat section 42, a femoral section 43–43' (see FIG. 19) and a foot or leg rest section 44. The headrest section 39 is manually operated, as presently will appear, the spinal section is operated by a hydraulic piston and cylinder assembly generally indicated by the numeral 46, and the femoral section 43 is operated by a hydraulic piston and cylinder assembly, generally indicated by the numeral 47. The purposes and advantages of a five section table will be fully described and claimed in a separate Patent No. 3,041,121.

Figure 7:
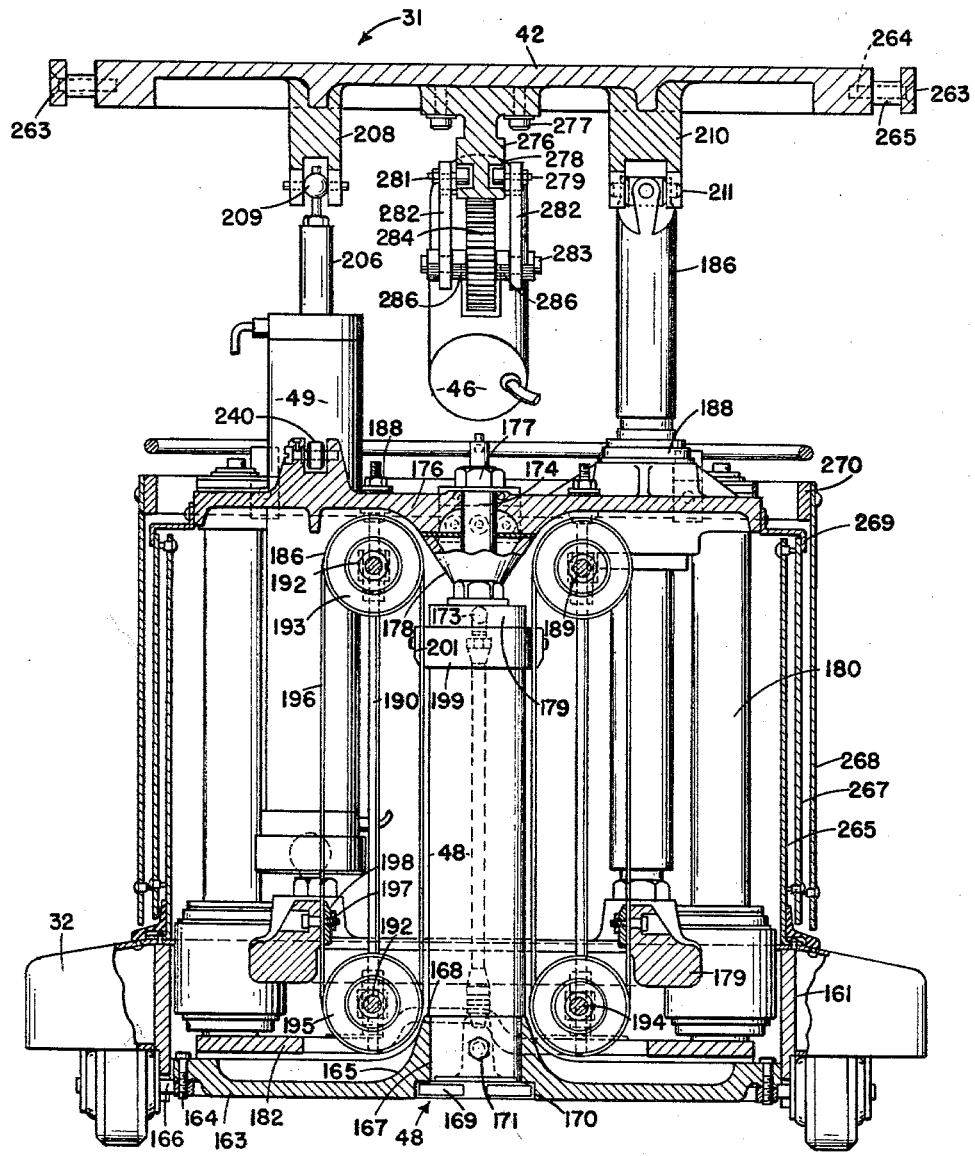
FIG. 7 is a sectional view taken substantially on the line 7—7 of FIG. 6B in the direction indicated by the arrows.

Referring now to FIGS. 6B and 7, the table 31 is raised and lowered by a hydraulic piston and cylinder assembly, generally indicated by the numeral 48. Lateral tilt of the table about a longitudinal axis in accomplished by a cylinder and a piston assembly, generally indicated by the numeral 49. Movement of the table to Trendelenberg (FIG. 23) or reverse Trendelenberg (FIG. 25) positions, that is, pivoting the table about a horizontal transverse axis, is accomplished by a piston and cylinder assembly generally indicated by the numeral 51.

Referring now to FIG. 22 the hydraulic system has been shown diagrammatically. From this diagrammatic view, it is believed the hydraulic system will be clear without specifically tracing the hydraulic lines in other views. Housed in the control box 34 are five valve assemblies: a table elevating and lowering valve assembly 52; a Trendelenburg and reverse Trendelenburg valve assembly 53; a femoral valve assembly 54; a back or spinal cylinder valve assembly 56; and a lateral tilt valve assembly 57. Each of the hand controls 36 has a neutral central position, a forward position and a back position as indicated by the arrow A in FIG. 5. The remainder of the hydraulic system will be later described. It is sufficient for present purposes to state that when the handle 36, associated with the table elevating valve 52, is pulled rearward from its central neutral position, oil is supplied to the bottom of the elevating cylinder 48 to urge the piston therein in an upward direction.

Simultaneously, oil is exhausted from the top of the elevating cylinder and returned to a sump or oil reservoir. Similarly with the valves 53, 54, 56 and 57, when the handle corresponding to each of these valves is pulled rearward, oil is supplied respectively to the top of the Trendelenburg cylinder 51, the bottom of the femoral cylinder 47, the bottom of the spinal or back cylinder 46 and the bottom of the lateral tilt cylinder. Simultoneously the upper or lower ends of these cylinders are connected to the exhaust or oil sump 69. Reverse movement of the handles reverses the direction of oil flow.

Figure 10:
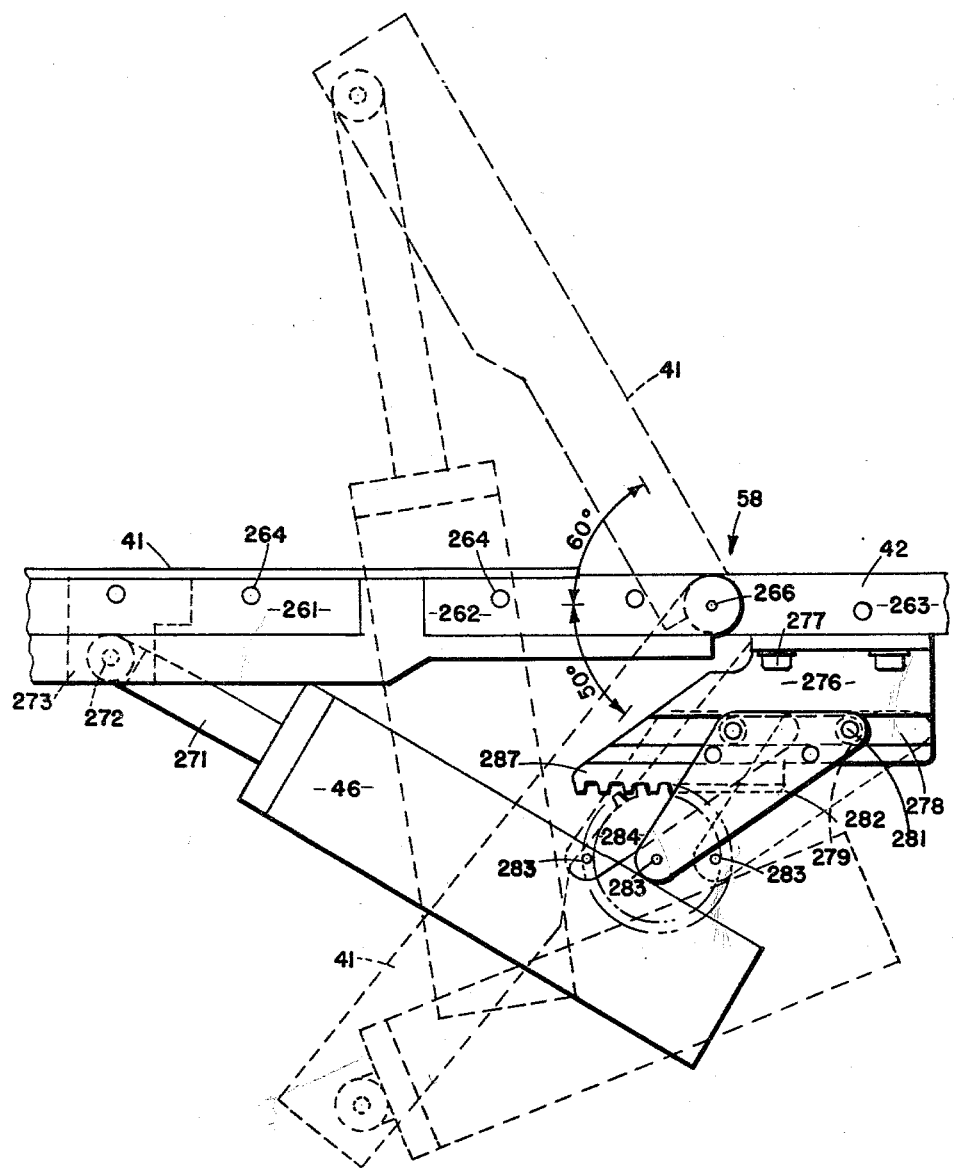
FIG. 10 is a side elevation of the spinal or back section of the table showing the actuating mechanism therefor and showing in dotted lines the extreme lowered position and the extreme raised position of the section with respect to the pelvic section.

Referring now to FIGS. 6A and 6B, the spinal section 41 is connected to the pelvic section 42 by a hinge assembly, generally indicated by the numeral 58, and is capable of being moved, upon supplying oil to one side or another of the spinal piston 46, to the solid or dotted line positions of FIG. 10 or any intermediate position. The construction and operation of the spinal section will be more particularly described later. The femoral section 43 is connected to the pevlic section 42 by an articulation assembly, generally indicated by the numeral 59, and shown most clearly in FIG. 13. By supplying oil to either end of the femoral cylinder 47, the femoral section 43 may be shifted with respect to the pelvic section 42 to the solid and dotted line positions shown in that view or into any intermediate positions.

Referring now to FIGS. 2, 3, 4, and 5, the motor and pump housing 33 is mounted on the base 32, being carried in the margins of an opening 61 in the base. For purposes which will presently be apparent, the housing and control box 34 are mounted adjacent to the head end of the table. The housing 33 and associated parts are carried in the opening and supported by transversely extending framing members 62 which are rigidly mounted in the base 32.

A cylindrical wall 63 is seated on one of the transverse framing members 62 and a framing member or block 64. The cylindrical wall 63 is suitably fastened to the margins of the circular opening in the base and an annular ring of rubber for sound-deadening and sealing purposes is seated at the juncture between the base 32 and the wall 63. An oil reservoir 69 is secured to the framing member 62 by screws 68. Return flow of oil from the hydraulic cylinders takes place through exhaust or return pipe 72 which extends through oil reservoir lid into the reservoir. The connections to and from the hydraulic system are made in a block 70 which has suitable manifolds (not shown) formed therein. A baffle 73 is provided in the sump 69 to maintain the oil in the sump somewhat quiescent.

In FIGS. 3 and 4, we have only partially indicated the hydraulic connections generally at 74 as the hydraulic circuit will be better understood when the diagrammatic circuit of FIG. 22 is described in detail.

A relatively thick-walled, generally cup-shaped casting forms a housing 71 which is mounted within the wall 63. The housing 71 is formed with a shoulder or ledge 76. The shoulder 76 rests upon and is supported by framing member 62 and other framing members not shown. Protruding portions of the bottom wall of the housing rest on the top of the reservoir 69.

The housing 71 is formed with a flattened wall portion 77 (see also FIG. 4) disposed toward the foot end of the table and extending transversely thereof to provide a space between the circular trim wall 63 and the flat housing wall. This arrangement of parts provides a space for the return piping to the sump and for the intake pipe to the pump of the hydraulic system of FIG. 22. A heavy cap or cover 78 is mounted on top of the housing 71 to complete the enclosure for a combined pump and motor 79 (see also FIG. 5). The pump and motor are mounted in a common cage. The heavy cap 78 is secured to the housing 71 by means of suitable screws 81 to provide an explosion proof enclosure for the pump and motor. A cylindrical pivot member 82 projects upwardly from the upper surface of the cap 78 generally centrally thereof.

The pump-motor combination 79 mounted in the common cage, as shown, has at its upper portion, a plurality of angularly spaced brackets 83 in this case three. These brackets are hung by bolts 84 from the heavy cover 78. Resilient shock and vibration absorbing washers 86 are interposed between each bracket 83 and the cap 78. The pump and motor combination 79 are rigidly but resiliently supported and the assembly held in position by nuts. The housing 71 is formed with the necessary opening (not shown) for electric cords 87 (FIG. 5) and for hydraulic lines to provide for oil supply to the pump and oil discharge from the pump (see FIG. 4). The electrical circuit for the motor is shown in FIG. 21 and need not be described in detail. The circuit includes a number of quick disconnect connectors 90 which enable the motor to be disconnected from the circuit for service. In case of power failure a hand operated pump can be connected into the hydraulic circuit to permit the carrying out of emergency operations notwithstanding the power failure. A connection 105 is provided for the reception of the auxiliary hand pump. The circuit also includes a motor starter relay 85, make and break contacts, a thermal switch 95, a motor starting switch 157 and a starting capacitor 100. A connection for a hand pump is shown at 105.

A rotatable member or plate 91 (FIG. 3) having a hub 92 encircles the cylindrical pivot 82 for rotational movement about the pivot. A retainer 93 held in place by a wave washer spring and screw is threaded into the end of the pivot 82. The retainer 93 thus resiliently bears against the hub and introduces a variable amount of friction between the parts to partly resist a swinging movement of the rotatable member 91 about the pivot.

The rotatable member 91 is provided with outwardly and angularly extending arms 94 (FIG. 4). The arms 94 have upwardly extending ears 96 which are apertured to receive a pivot rod 97. The pivot rod 97 is threaded at its ends to receive nuts 98. The pivot rod 97 is provided with a bearing 99 at each end and a spacing sleeve 101 extends between the ears 96. By tightening or loosening the nuts 98, the friction between the parts may be adjusted for a purpose which will be presently apparent. The elements just described form a pivot for a hollow arm 102 upon the outboard end of which the control box or unit 34 is mounted.

The arm 102 (FIG. 4) has two spaced inboard end portions 103 which are apertured to encircle the spacing sleeve 101. Extensions of the ends of the arm 102 have a rod 104 extending between them and are adapted to receive one of the ends of the two springs 106. The other ends of the springs are connected to two transversely extending pins 107 which are fixed in a depending part 108 of the rotatable member 91.

Figure 2:
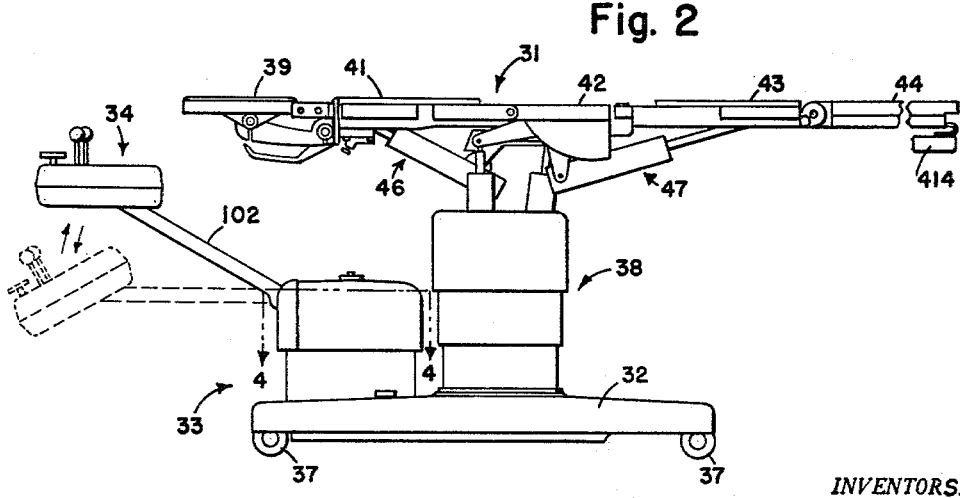
FIG. 2 is a side elevation thereof, showing the arm, on which the hand control box is mounted, swung to the upper limit of its pivotal movement, and showing in dotted lines the position of the arm when it is swung to the lower limit of its pivotal movement.

Through the pivotal and frictional connection above described, the control box 34 and the arm 102 may be manually swung from the solid line to the dotted line position of FIG. 2, the weight of the control box and the arm being counterbalanced by the springs 106. The nuts 98 are adjusted so that there is sufficient friction between the parts to the end that the control box and arm will remain in any position in which it is placed and some physical force is required to move it from one position to another.

It will be understood that the conduits for carrying oil to the various cylinders extend through the arm 102 which has a removable cover (not shown) for gaining access to the conduits. These conduits are of flexible plastic materials and are connected to valve units 52–57 located in the control box 34 (see FIG. 22). The control box or movable control island is also provided with a removable cover enabling access to the valves. The flexible conduits not shown in FIG. 3 but shown in FIG.

22 are coiled in the spaces of the discs 117 and 118 above the rotatable member 91.

Now considering the rotational movement of the arm 102 and the control box 34 about the vertically extending pivot 82, it will be apparent from an examination of FIG. 1 that the control box may be pivoted or swung from the solid line position of FIG. 1 to either of the dotted line positions shown in that view. The control box may be shifted through approximately 180 degrees giving the anesthetist or other member of the operating team a wide choice of positions for the control box to minimize interference with other members of the surgical team. To limit the amplitude of movement of the arm and control box, the top wall 78 of the housing 71 has a pair of spaced pins 111 mounted thereon which are engaged by one or the other of the arms 94 at the ends of their travel. An adjustable brake 115 having a braking surface rides on the upperside of the cap 78 and serves to hold the arm 102 in the position to which it has been adjusted. The details of this brake have been shown in FIGS. 29 and 30 and include an adjusting screw 120 extending through the rotatable member 91 and through the brake housing. By adjusting the screw the friction between the parts may be varied.

The hub 92 (FIG. 3) of the rotatable member 91 has a circular shoulder and a cylindrical spacer 116 is seated on this shoulder. A centrally apertured disc 117 is mounted on the upper end of the spacer 116. A plate 118 is welded to the spacer 116 intermediate its ends. A cup-shaped disc is mounted on the disc 117 and a plurality of tie rods 121 connect the discs 119, 117, and 118 to the rotatable member 91. These parts all move together when the arm 102 and control box 34 are shifted around the head end of the table. An appearance cover 122 having an enlarged slot to accommodate the arm 102 extends over and encloses the plastic hydraulic tubing coiled around the tie rods 121 between the appearance cover and the rotatable member 91. The appearance cover is secured to the disc by a screw 123.

It is usual practice during a surgical operation for the anesthetist to stand adjacent the head end of the table so that he can clearly observe the patient. It is usually necessary for the surgeon to walk to various positions with respect to the table to perform his functions. Nurses and others in the surgical team must move about the table freely. Thus, the anesthetist who usually controls the movements of the table, in accordance with the condition of the patient or the instructions of the surgeon, can shift the control box to any desired position around the head end of the table to avoid as much as possible interfering with the free movements of the surgeon and the operating team. The control box 34 may be shifted to the lowered dotted line positions of FIG. 2 and if the patient does not require the anesthetist's constant attention he can be seated while functionally controlling the movements of the various sections of the table by means of hand controls 36.

The location of all the controls in a position remote from the table and particularly the perimeter thereof removes all cranks, wheels or other manually actuated devices from adjacent to the edges of the table. The surgical tables now on the market have the various manual controls located just beneath the perimeter of the table. Some of these protrude slightly beyond the perimeter so as to increase their accessibility. In addition, in tables now on the market the controls protrude below the table. The location of the controls causes members of the surgical team to bump into them frequently resulting in severe bruises. The location of the controls also frequently interferes with the surgeon himself for some operations. In present tables assuming the anesthetist controls the positioning of the table sections, it is necessary for him to move from one position to another about the table when a change in the relative positions of the table sections is required. This necessity causes traffic about the table likely to interfere with the surgical team and their attention to the patient being operated upon. In fact the necessity for the anesthetist to change his position to operate controls frequently results in an interruption of the operation. If he cannot move from his position observing the patient, he must ask others to actuate the controls.

Figure 5:
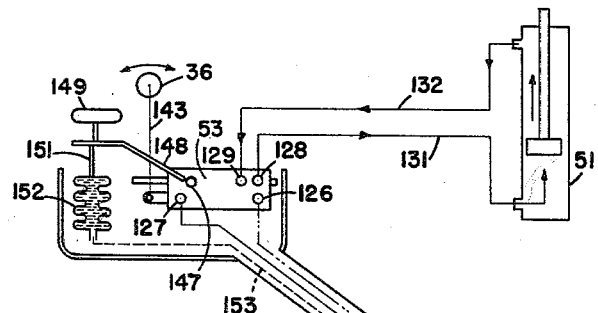
FIG. 5 is a schematic view of a part of the hydraulic system showing one of the five valve assemblies and illustrating the operation of part of the hydraulic system.

Referring now to FIG. 5, there is shown one of the bodies of the valve assemblies shown diagrammatically in FIG. 22. Let us assume that it is valve assembly 53 of the Trendelenburg cylinder. The Trendelenburg cylinder 51 is also shown in the same view together with the connections to the motor and pump. The particular valve employed in the valve housing 53 is of the sliding spool type and since hydraulic valves of this general type are well known in the art such a valve suitable for the purpose need not be particularly described. The system is provided with pressure relief valves (FIG. 22) 140 built into the valve body. Each pressure relief valve is adjustable for desired pressure drop and governs the retracting motion by partially relieving pressure on the top of the piston. The unused pressure is fed back into the common exhaust line. This reduced pressure on the top of the piston is another safety feature of the table. Should any section of the table top take up against the floor, in some possible combined motions, the piston movement immediately comes to a halt and self-destruction of the table top is prevented.

Figure 12:
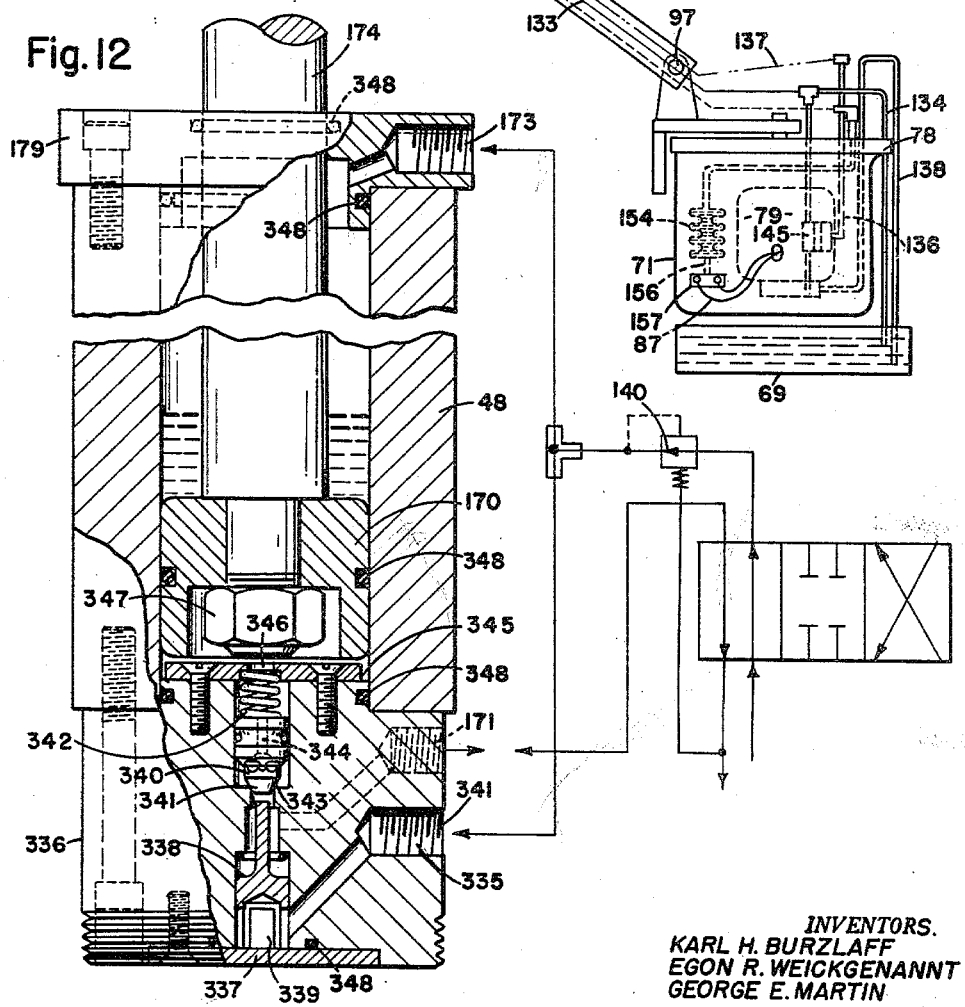
FIG. 12 is a sectional view partially broken away showing one of the hydraulic cylinders for the table and showing schematically the hydraulic connections for actuating the piston.

The pressure connection from the pump to the valve is shown at 126 and 127 is the exhaust connection. 128 and 129 are either pressure or exhaust connections depending upon to which end of the cylinder 51 oil is being supplied through lines 131 and 132. As the arrows indicate in FIG. 5, oil under pressure is being supplied through line 131 to the lower side of the piston while oil is being exhausted from the upper side thereof through the line 132. Under these conditions the valve handle 36 would be pulled to the left, as viewed in FIG. 5, moving the slide valve to the left and ports 129 and 127 would be connected together to return the oil from above the piston through the exhaust lines 133 and 134 to the sump 69. Simultaneously the movement of the valve would connect port 126 to port 128 and oil under pressure would be supplied from the combined motor and pump 79 through pressure line 136 and pressure line 137 to the port 126. Oil is drawn into the pump through a line 138 from the sump. A pressure relief valve 145 is located in pressure line 136. A diagrammatic line drawing of the valve connections to the supply and exhaust lines is shown at the right of FIG. 12. The complete hydraulic system is shown in FIG. 22 and the oil lines can be easily traced. In that view the numeral 150 refers to cut-off valves and 155 is a vent for the entire system. Since hydraulic valves and circuits of this type are old and well known they need not be more particularly described.

One of the important features of our invention lies in the fact that the accidental movement of one of the hand controls 36 will not cause actuation of the pump and the supply of oil to any of the cylinders; there must be a deliberate positive action on the part of the operator. This most important safety factor is accomplished by a novel control and mechanism. An arm 148 is pivotally mounted at 147. The arm carries a pressure pad 149 adapted to receive the palm of the hand of the operator, usually the anesthetist. The pressure pad 149 is connected through the arm 148 by connection 151 to a bellows 152 filled with oil. The bellows 152 is connected by a hydraulic line 153 to a second oil filled bellows 154. The bellows 154 has an actuator 156 depending therefrom for a micro-switch 157. As shown in FIG. 5, the bellows 154, the micro-switch 157 and the electrical connections 87 to the motor are located in the housing 71.

When the parts are in the position shown in FIG. 5, the motor and pump are not operating. Upon the operator pressing upon the pressure pad 149 preparatory to actuating a hand control 36, the bellows 152 is partially collapsed to place pressure on the oil within the bellows.

This pressure applied through the line 153 expands the bellows 154 and actuates the micro-switch 157 to start the motor. The desired hand control 36 can then be actuated to supply oil to the selected cylinder to cause the desired table operation. The actions of applying pressure on the pressure pad 149 and actuating the desired hand control 36 are substantially simultaneous. This safety feature is extremely important in preventing accidental or unintended movements of the table during a surgical operation. Accidental or inadvertent movement of the table and without the knowledge of the surgeon or anesthetist could in the case of delicate surgical operations be fatal to the patient.

Referring now particularly to FIGS. 6B, 7, 14 and 15, the supporting and adjusting system for raising and lowering the table; lateral tilt of the table in either direction about a longitudinal axis and Trendelenburg or reverse Trendelenburg tilt of the table about a transverse axis are shown. These movements are accomplished by actuating the hand control 36 associated respectively with the valve assemblies 52, 57 and 53 (FIG. 22).

Supported from the base 32 as by welding thereto, is a frame 161 substantially rectangular in cross-section (FIGS. 6B and 7). This frame is wholly below the top surface of the base 32, so that the lower edges of the frame are just above the floor. This arrangement permits the lowering of the table surface a maximum amount which is essential for some operations particularly where the surgeon is short in stature. A fixed base plate 163 is secured by means of screws 164 (FIG. 7) to brackets 166 carried by the rectangular frame 161. The fixed base plate 163 has a cylindrical centrally located socket 167 formed in a boss 165 in which the bottom of the table lift cylinder 48 is seated. The lift cylinder 48 has a portion at 168 of decreased diameter to form an annular shoulder which seats on the margins of the socket 167. The lift cylinder is locked in the socket by means of a ring nut 169 which projects from the lower end of the cylinder and projections thereon engage the margins of a recess 170 formed in the bottom of the base plate 163.

All the hydraulic connections have not been shown in FIGS. 6B and 7 as an attempt to show all the hydraulic connections in all the views would confuse the drawings. The hydraulic connections will be clear from an examination of FIG. 22. However, the inlet connection to the bottom of the cylinder is shown at 171 and the inlet to the top of the cylinder is shown at 173.

A piston not shown in FIGS. 7 or 8 but indicated in FIG. 14 by the numeral 170 (see also FIG. 12) is rigid with a piston rod 174. The piston rod 174 is rigidly connected to a top plate or yoke 176. For this purpose the upper end of the piston rod 174 is threaded to receive an upper nut 177 and a lower, somewhat conically shaped nut 178. Suitable washers are provided between these nuts and the upper plate 176 which is confined between the nuts and moves upward and downward with the piston rod. The hydraulic connection 173 is located in a cap 179 through which the piston rod 174 passes.

Four hollow tubes 180 (see also FIGS. 14 and 15) are secured to the respective corners of the top plate 176 by any suitable means such as indicated by the numeral 181 (FIG. 6B). The tubes 180 are rigidly connected at their lower ends to a movable plate 182 by suitable means. For example, the tubes may be welded to the margins of openings formed in the movable plate 182. Rigidly secured to the bottom plate 163 are four posts 183 with respect to which the hollow tubes 180 telescope. Within and secured to each of the hollow tubes is a sleeve bearing 184, one being located at the top of each tube and the other at the bottom of each tube. These sleeves 184 ride on posts 183.

A movable plate or platform 179 carries a bearing assembly generally indicated by the numeral 186, at each of its four corners. It is unnecessary to describe these bearing assemblies in detail, it being sufficient to state that the bearing assemblies ride on the exterior cylindrical surface of the tubes 180. The movable plate or platform 179 carries, by means presently described, the lateral tilt cylinder 49, the Trendelenburg cylinder 51 (FIG. 6B) and a fixed post 186 (FIG. 7).

Figure 15:
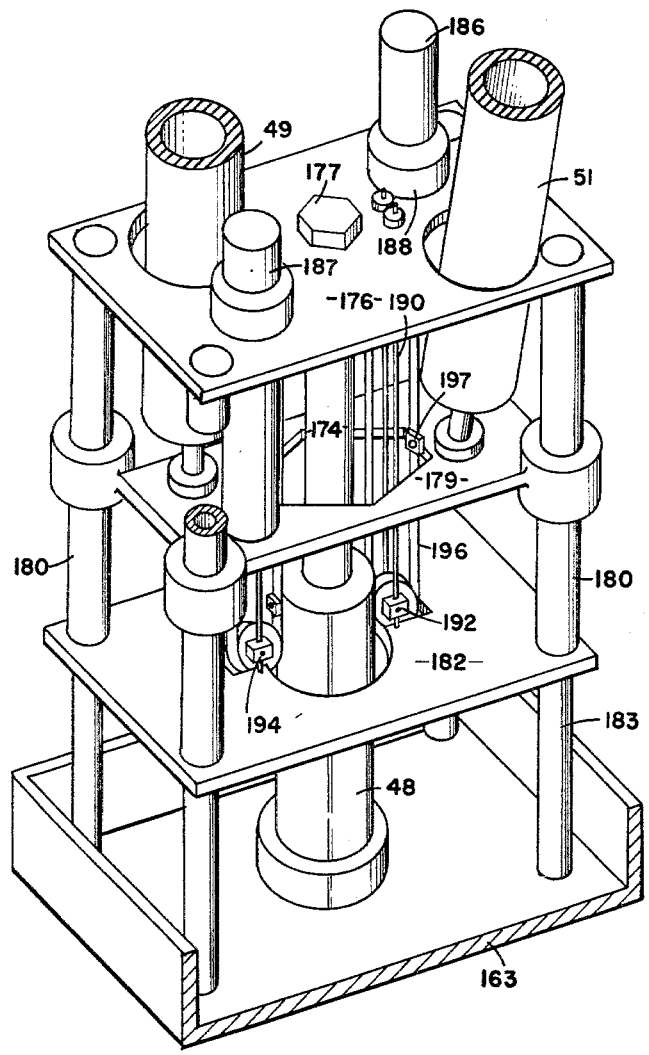
FIG. 15 is a perspective view showing the cage and platform, raised and lowered by the elevating cylinder, which carries the tilt cylinders and which is raised and lowered accompanied by an upward and downward movement of the table top.

FIG. 15 is a diagrammatic perspective view of the assembly just described, showing the lateral tilt cylinder 49, the Trendelenburg cylinder 51, the long fixed post 186 and a short fixed post 187. The two posts extend through bushings 188 carried by the movable plate or yoke 176. The function of the short post 187 is merely to lend stability to the structure, while the function of the long fixed post 186 will be later described. The lateral tilt cylinder 49 and the Trendelenburg cylinder 51 extend through large openings (FIG. 15) formed in the plate or yoke 176.

Referring now again particularly to FIGS. 6B and 7 and also the diagrammatic views of FIGS. 14 and 15, a pair of pulleys 193 are suspended from the plate or yoke 176 by four tie rods 190, the upper ends of which are threaded to receive nuts 191 which lock the tie rods to the plate or yoke 176. The tie rods 190 support blocks 192 which carry short shafts 189 for the rotational reception of the pulleys 193. The tie rods 190 extend downward and receive blocks which carry shafts 194 for the rotatable support of a lower set of pulleys 195. The lower ends of the tie rods are threaded, as shown, to the movable plate 182 (FIG. 6B). The upper plate or yoke 176 is connected to the lower movable plate 182 by the hollow tubes 180 to form a box structure which is moved upward and downward as a unit by the elevating piston rod 174.

A continuous steel tape 196 passes over each of the two sets of pulleys and is connected to the platform 179 by means of a nut and bolt assembly 197 which holds a flat anchoring retainer plate 198. This retainer plate 198 and nut and bolt assembly 197 fastens the tape to the platform 179. A fixed collar 199 is carried by the lift cylinder 48 and retainer plate and screw assemblies 201 rigidly connect the two steel tapes to the collar 199.

It will be apparent from the foregoing and, by particular reference to FIGS. 14 and 15, that when the piston rod 174 is raised, upon the application of hydraulic fluid beneath the piston 170, it carries with it yoke 176 and the movable plate 182. The yoke 176 and the plate 182 are carried upward in fixed spaced parallel relation because the plate 182 and the yoke 176 are tied together by the sleeves 180 which ride on the fixed posts 183. Likewise, platform 179, by reason of it being fixed to the tapes at 197 and fixed to a fixed collar 199 at 201, moves upward with the yoke since the tie rods which carry the pulleys are supported from the yoke 176. However, the upward movement of the platform 179, because of the pulley and tape assemblies above described, moves upward at twice the rate of the yoke 176 and the plate 182.

The purpose of this speed multiplication arrangement is to increase the amplitude of movement of the table surface as compared to the amplitude of movement of the piston rod 174. To meet the needs of various operative positions and to accommodate both the tall and the short surgeon, the amplitude of movement of the table surface must be large compared to the stroke of the lift cylinder 48. Since the lateral tilt cylinder 49, the Trendelenburg cylinder 51 and the post 186 are all carried by the platform 179 and these elements carry the pelvic or seat section 42, these cylinders and the fixed post are always in fixed relation to the table surface. The purpose of continuing the tapes over the fixed point on the lift cylinder 48, as shown at 201, is to prevent upward movement of the table surface, upon manual lifting on the perimeter of the table top as may be required to place the table in a truck or other conveyance for transporting the table a substantial distance.

The lateral tilt cylinder 49 has a piston rod 206 projecting upwardly therefrom (FIG. 7) actuated by a piston 207 (see FIG. 11). The lower end of the lateral tilt cylinder 49 is pivoted as will be more clearly later described. A boss 208 having a bifurcated lower end projects downward from and is integral with the lower side of the pelvic section 42. The upper end of the piston rod 206 has a universal joint connection. The two joint connections form the universal joint 209. A second boss 210 projects below and is integral with the pelvic section of the table top and a universal joint connection 211 is formed between the boss and the upper end of the post 186.

Referring now to FIG. 8, depending below and integral with the pelvic section of the table top is a third bifurcated bracket or boss 216 which is connected to the upper end of a piston rod 217 secured to the piston of the Trendelenburg cylinder 51 by a universal joint 218. Universal joints of the general type illustrated at 209, 211 and 218, are old and well known and need not be further described.

In the normal position of the table with the table surface horizontal and parallel to the floor, the universal joints 209 and 211 (FIG. 7) are in alignment transversely of the table and the universal joints 211 and 218 are in alignment longitudinally of the table. When oil under pressure is supplied to the lateral tilt cylinder 49, the tilt cylinder swings in a plane transverse to the table about the pivot at its lower end (to be described). By reason of the universal joint 209 and the universal joints 211 and 218, the table top is swung about a longitudinally extending axis defined by the universal joints 211 and 218.

The direction of lateral tilt depends upon which side of the lateral tilt cylinder oil is admitted to, there being equal amounts of oil on opposite sides of the piston in the cylinder when the table is horizontal. Likewise, when oil under pressure is supplied to the Trendelenburg cylinder 51, piston rod 217 is extended to tilt the table to the Trendelenburg position shown in FIGS. 9 and 23. The table then swings about an axis transversely of the table formed by the transversely aligned universal joints 209 and 211. It will also be obvious that the table top can be swung to the reverse Trendelenburg position. The horizontal position of the table top is shown in solid lines in FIG. 9 and the Trendelenburg and reverse Trendelenburg in dotted lines. FIG. 9 is a somewhat diagrammatic showing of the Trendelenburg and reverse Trendelenburg positions since the actual location of the pivot point is below the table surface and to the left of the table centerline about at the point 209 of FIG. 9.

By reason of the fact that the lower ends of the lateral tilt cylinder and the Trendelenburg cylinder are pivoted (presently described) and by reason of the universal joints 209, 211 and 218, it is possible to laterally tilt the table and simultaneously or sequentially put the table into the Trendelenburg or reverse Trendelenburg positions. When this is done universal joints 209 and 211 are out of transverse alignment and the universal joints 211 and 218 are out of longitudinal alignment.

The lateral tilt cylinder 49 and the Trendelenburg cylinder 51 are identical. One of them is shown in FIG. 11. A ball joint 226 has a threaded extension 227 which is threaded into the platform 179 to anchor the cylinder thereto. The ball joint 226 extends through an opening in the cap 224 and into a shaped recess 228 formed in a bottom plug 223. The ball seats upon a nylon cushion 229 located in the recess 228 and the inner surface of the cap 224 has a nylon cushion 231. The above arrangement allows a universal movement of the cylinder and its associated parts about the ball joint 226.

An element 237 of the universal joint 209 (or 218) has a threaded stem 238 threaded into the top of the piston rod and locked in position by a nut 239. It will now be appreciated that the lateral tilt and Trendelenburg cylinders can pivot about the balls 226 as a universal joint to accommodate the lateral tilt and Trendelenburg tilts described above. For structural support purposes, a roller 240 on each side of lateral tilt cylinder 49 carried on pins supported in the top plate casting 176 (FIG. 7) rides on flats on each side of the cylinder.

One fact of particular importance will be noted. The depending brackets or bosses 208, 210 and 216 which carry a part of the universal joints and to which the universal joint parts of the piston rods connect are all located on the lower side of the pelvic section of the table top. The spinal section 41 and the femoral section 43 are supported from the pelvic section as mentioned above and as will be hereinafter fully described. This fact is of particular importance in a five section table as will be more particularly described in Patent No. 3,041,121.

Referring now to FIGS. 1 and 2, the table includes side rails 261, 262 and 263 on each side of the table. The side rails are rigidly secured to the various sections by means indicated at 264 having spacers 265 mounted thereon. These side rails are for the purpose of adjustably holding clamps for arm rests, leg rests, or stirrups, an anesthetic screen and other removable accessories with which the table may be equipped. Between the pelvic section and the spinal section, these side rails are overlapped and formed with openings to receive hinge pins 266 on opposite sides of the table. These hinge pins form the articulated joint or hinge generally indicated by the numeral 58 in FIG. 10, the hinge being shown at 266 in the same view. The lift cylinder 48 and other mechanism (FIG. 7) is enclosed and the lateral tilt and Trendelenburg cylinders partly enclosed by an appearance cover. The appearance cover comprises cylindrical sheet metal parts 265, 267 and 268. The appearance part 265 is fixed to the base while the appearance parts 267 and 268 telescope with respect thereto. Appearance part 267 is carried by plate 176 as shown at 269 while appearance part 268 is carried by a ring 270 supported from platform 179. Appearance part 268 thus moves twice as fast as appearance part 267.

In FIG. 10, the mechanism for raising or lowering the spinal or back section 41 about the pelvic or seat section 42 has been shown in Patent No. 3,041,119. This swinging movement occurs about the hinge axis 58 or hinge pins 266. The hydraulic connections to the spinal cylinder 46 are illustrated in FIG. 22 in a diagrammatic manner and these connections are not shown in FIG. 10 for the purpose of simplifying this view. The piston (not shown) of the spinal cylinder 46 has a piston rod 271 rigidly connected thereto, the end of which is bifurcated and pivoted on a hinge pin 272 carried by a bracket, indicated at 273, depending below the spinal section 41.

Normally when the spinal section 41 and the femoral section 43 are in a horizontal position their cylinders 46 and 47 are filled with oil about equally on both sides of their pistons. When oil under pressure is admitted to the lower end of the spinal cylinder 46, the pressure actuates the piston within the cylinder 46 and simultaneously, oil is exhausted from the upper side of the cylinder and returned to the sump 69. This action moves the spinal section 41 about the pivot joint 58 to the upper dotted line position shown in FIG. 10. In this view we have shown the limit of the upward movement of the spinal section 41 but it will be understood that any intermediate position from the solid line position of FIG. 10 to the upper dotted line position of the same view, is possible.

When oil under pressure is applied to the top side of the piston within the spinal cylinder 46 and exhausted from the underside thereof, the spinal section 41 is swung to the lower dotted line position of FIG. 10 or any intermediate position between the solid line position and the lower dotted position.

It will be noted from FIG. 10 that the spinal section 41 can be swung downward through a total angle of approximately 50°. The upward angular movement of the spinal section with respect to the pelvic section should be preferably somewhat larger. As shown in the drawings the spinal section may be swung through an angle from the horizontal of approximately 60°. This increased angle of movement is desirable in some operating positions. In the extreme upward position of the spinal section shown in FIG. 10, the weight of the patient on the back or the spinal section 41 places an undue strain upon the mechanism for supporting the spinal section. To avoid strain on the supporting means of the spinal section, a unique movable support is provided.

For the above purposes, a bracket 276 is supported from the underside of the pelvic section 42 by means of bolts 277. The bracket 276 has a pair of horizontally extending roller guides or ways 278 (see also FIG. 7). The roller guides 278 are adapted to receive rollers 279 carried by roller pins 281. The roller pins are rigid with a pair of depending plates 282. A pivot shaft 283 extends through openings formed on the lower ends of the plates 282 and through an opening in a partial gear 284. On the shaft 283 are suitable means, indicated at 286, for spacing the parts and holding them in assembled relation. The partial gear 284 is rigidly mounted on the sidewall of the spinal cylinder 46 as by welding or in any other suitable manner.

Mounted on and rigidly secured to the bracket 276 is a rack 287 which meshes with the partial gear 284. In FIG. 10 we have indicated a solid and two dotted line positions for the plates 282 and, hence, for the shaft 283.

It will now be appreciated that as the spinal section 41 is swung from the solid line position in an upward direction, the rollers 279 ride to the left in the roller guides 278, as viewed in FIG. 10. The fulcrum point of the leverage system thus described, comprising the spinal section and the support therefore is the shaft 283. During the upward movement, the spinal section, the shaft 283 moves from a solid line position of FIG. 10 to the dotted line position. Since the fulcrum point has been moved to the left as viewed in FIG. 10, the leverage supporting the spinal section is such that possibility of collapse of the spinal section is minimized and the spinal section is rigidly supported in the upper dotted line position of FIG. 10.

When the spinal section is swung down to the dotted line position of FIG. 10, shaft 283 moves to the right, as indicated in FIG. 10, of its normal solid line position. This also increases the leverage supporting the spinal section in its downward dotted line position. As shown, the amplitude of downward movement of the spinal section is decreased because extreme movement of the spinal section in the downward direction is unnecessary.

Referring now to particularly FIGS. 6B, 8 and 13, the hinge arrangement between the femoral section and the pelvic section is shown and will be made the subject of a separate application. Depending from the pelvic section 42 (FIG. 8) are a pair of bosses 291 which have a cutout 292 between them. A pair of support plates 293 are fixed by means of a plurality of screws 294 threaded into the bosses and pass through the plates 293. Carried at the lower end of the femoral cylinder 47 is a pair of pivot pins 296 which are supported in the bottom of the cylinder and extend outward through apertures 297 in the plates 293. The femoral cylinder 47 is free to swing about the axis of the pivot pins 297.

The femoral cylinder has a piston mounted therein to either side of which oil may be admitted, as indicated diagrammatically in FIG. 22. Simultaneously with the application of oil to one side of the piston, oil is exhausted back to the sump 69 from the other side thereof. A piston rod 298 is secured to the piston (FIG. 13) and is pivoted to a boss depending from the lower side of the femoral section 43, the pivot point of the piston rod being indicated at 301.

Figure 13:
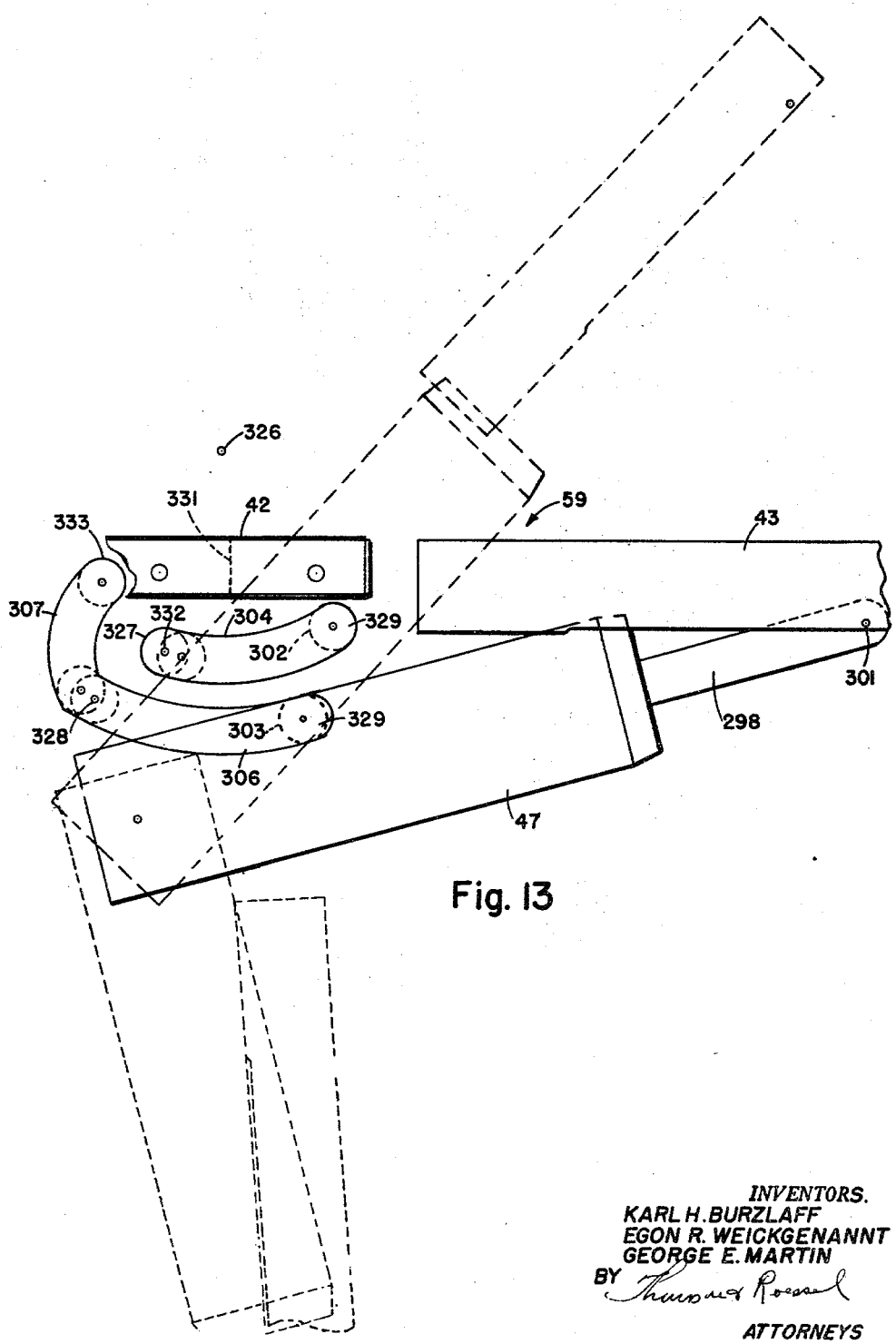
FIG. 13 is a side elevation showing the pelvic section and femoral section in solid lines, showing somewhat diagrammatically the mechanism for actuating the femoral section with respect to the pelvic section. and the dotted line extreme positions of the femoral section with respect to the pelvic section.

Referring to FIG. 13, the femoral section must be capable of swinging from the horizontal position shown in solid lines in that view to either of the dotted line positions shown in the same figure. This swinging movement is accomplished by a compound motion produced by a pair of rollers 302 and 303 riding in cam grooves 304, 306 and 307.

The hip joint of a patient lies five or six inches above the pelvic section and the compound movement allows for this condition, the movement of the femoral section allowing the hip joint to swing naturally about this axis. A pair of brackets 311 (FIG. 8) depend from the underside of the table adjacent the sides thereof. The brackets are attached to a side shoulder formed on the table top by screws 312 which pass through the brackets 311 and are secured to the table, as indicated at 313. The brackets 311 carry the cam grooves 304, 306, 307.

Depending from the underside of the femoral section 43 at opposite sides thereof and attached thereto by screws, are a pair of bosses 315 (see FIG. 6B). The bosses 315 each carries a bracket 314 which is angularly shaped or inverted L-shaped, as viewed in FIG. 8. The base 316 of the inverted L, extends outward and has an elongated portion 311 extending toward the pelvic section or head end of the table. Adjacent the end of part 317 of the bracket 314, a pair of pivot pins 321 are located which are secured to the portion 317 of the bracket 314, as indicated at 322. The rollers are thus carried by the femoral section 43 while the cam grooves in which they rotate are carried in the pelvic section 42. Nylon spacers 325 are interposed between the bracket part 317 and brackets 311.

Referring again to FIG. 13, the hip joint is assumed to lie five or six inches above the table surface at an imaginary point 326. This point lies well above the table surface because of the pad with which tables are equipped and because of fat portions of the body below the hip joint. This imaginary point 326 is located as accurately as possible considering the differences in the physical makeup of various persons. The cam groove 304 is circular with the imaginary point 326 at the center of the circle. When the femoral section is in the solid line horizontal position of FIG. 13, the roller 302 lies at the end 327 of the cam groove and the roller 303 lies with its axis at the position 328.

When oil is admitted to the lower side of the piston in the femoral cylinder 47, the piston shifts the femoral section to the dotted line position shown in FIG. 13 or any intermediate position. During this movement the rollers 302 and 303 shift to the right in the cam grooves 304 and 306 until they engage stops 329. Since the cam grooves 304 and 306 are on the arc of a circle, the approximate center of which is the hip joint 326, the femoral portion of the patient's body swings with the femoral section 43 about the axis 326 of the hip joint. It will be particularly noted that when the femoral section 43 is swung upward the head end of the femoral section moves away from the foot end of the pelvic section, even though the rearward end of the femoral section stays in the same relationship to the hip joint 326, i.e., the femoral portions of the body do not shift with respect to the femoral section.

Referring now to FIG. 1 (see also FIGS. 19 and 20), the pelvic section has what is known in the art as a perineal cutout 331. When the table is to be used for perineal operations, the femoral section must be moved to an out-of-the-way position so that the surgeon is able to be seated close to the perineal cutout. For this reason, the compound movement of the femoral section is necessary.

In moving the femoral section from the solid line position of FIG. 13 to the dotted line position shown in that view, oil under pressure is admitted to the femoral cylinder 47 at the upper side of the piston within the cylinder and exhausted from the lower side thereof, as indicated in FIG. 22. As previously stated, when the femoral section is horizontal the roller 302 is in engagement with the end 327 of the cam groove 304. The axis of movement of the femoral section then becomes the axis of the roller 302 now located at the point 332. Actuation of the piston within the cylinder 47 then causes the roller 303 to move through the cam groove 307 about the axis 332 until the roller 303 reaches the end 333 of the cam groove 307. This movement of the femoral section results in the femoral section moving to the lower dotted line position of FIG. 13 in which position the femoral section essentially hangs downward almost vertically and the pivot point 332. The upper surface of the femoral section is, toward the head end of the table, spaced from the foot end of the pelvic section as is apparent from an examination of FIG. 13. The surgeon is then able to seat himself in close proximity to the perineal cutout with little or no interference from the femoral section.

In FIG. 12, we have illustrated a safety device common to all the hydraulic cylinders. It prevents a table section or the table from dropping accidentally once it has been adjusted to the desired position. Such accidental dropping of the table or a table section could be dangerous to the patient during a delicate operation. This safety device is incorporated in and will be described in connection with hydraulic lift cylinder 48. It will be understood that the ports 171 and 173 are either intake or exhaust ports depending the position of the elevating control 36 as indicated diagrammatically at the right of FIG. 12.

A pilot port 335 is formed in a block 336 secured to the lower end of the cylinder 48 by a plurality of elongated screws. A removable plate 337 closes a bore in the block 336. A pilot piston 338 is mounted in the lower end of the bore and has a spider 339 at its lower end so that oil under pressure may flow to the underside of the pilot piston 338 while the upper end of the piston has a vertically extending stem constituting a valve opener. A valve 340 having a frusto-conical end mates with a valve seat 341 formed in the block 336 and is held in position on the seat by a spring 342. The valve has spaced openings 343 which connect with a passage 344 extending through the center of the valve. A plate 345 having an opening 346 is held by screws on the top of the block, the opening 346 providing communication of oil from the pilot port 335 to the underside of piston 170 when the valve is open.

The piston 170 is connected to the piston rod by a nut 347 which lies in a recess in the piston, the lower end of the piston rod being threaded to receive the nut. O-ring seals 348 are provided between surfaces to prevent leakage of oil from the cylinder 48, block 336 and cap 179.

When oil under pressure is supplied to port 171 it opens valve 340 and has access to the lower side of piston 170 through passage 344 in the valve and through opening 346. As soon as the table reaches the position desired the port 171 is cut off by throwing the hand control 36 to the center neutral position. Immediately the valve 340 closes and the oil is locked in the cylinder with the table at the desired height. This safety feature is in addition to the locking of the oil beneath the cylinder caused by closing the ports in the slide valve 52.

When the table is in an elevated position and the operator desires to lower the table, the hand piece corresponding to the valve is shifted forward to open the slide valve and connect the ports 173 and the pilot port 335 to the source of oil under pressure. Pressure to the pilot port 335 raises pilot piston 338 until it seats on the O-ring in the bore in block 336. This causes the stem of the pilot piston to engage and open valve 340. Opening valve 340 allows oil to escape from the lower side of piston 170 through opening 346, through the drilled openings in the valve and through port 171 back to the sump. Immediately upon moving the control lever to the neutral position, the spring 342 closes the valve to cut off the flow of oil from the bottom of the piston 170 locking the remaining oil in the bottom of the cylinder 48. Of course, the slide valve also is in closed position should the valve 340 leak.

As shown in FIG. 16 which is a sectional view of the underside of the femoral and leg rest table sections (see also FIG. 6C), the leg rest section 44 is removable from the removable part 43 of the femoral section. For this purpose the femoral section has an adapter 351 secured thereto by screws on each side of the table. Each adapter has a track or ways 352 therein for the reception of a slide member 353 mounted on the leg rest section 44. The slide member 353 on each side of the table has a finger piece 356 which is pivoted at 354 by which the finger piece may be swung about the pivot 354. The end of the finger piece has a locking pin 357 pivoted thereto which fits into a bore 358 formed in the adapter 351 end of the femoral section. A spring 359 normally holds the slide member in the position of the parts shown in FIG. 16.

When the foot section is to be removed, the finger pieces 356 on each side of the table are pressed inward against the action of springs 359 to withdraw locking pins 357 from the bores 358. The slide members 353 may then be moved to the right, as viewed in FIG. 16, in the ways 352 and the foot section slid off the end of the femoral section. When replacing the foot section it is unnecessary to press the finger pieces 356 inward.

In most adults, the difference in their heights primarily occurs in their legs and in their spinal or back sections. For this reason the back or spinal section 41 and the femoral section 43 are made adjustable in length. The means for adjustment of the length of these two sections is the same so that a description of one will suffice.

In FIG. 19 the fixed spinal section has been indicated by the numeral 41′ while the movable spinal section has been indicated by the numeral 41. The spinal cylinder 46 (see FIG. 10) is pivoted at 272, as previously described, to the fixed section 41′. Similarly the fixed femoral section has been indicated by the numeral 43′ and the movable femoral section by the numeral 43. The femoral hydraulic cylinder 47 (see FIG. 13) is pivoted at 301 to the fixed femoral section 43′.

The adjustability of the spinal and femoral sections is illustrated in FIG. 16. The fixed femoral section 43′ is shown at the left of FIG. 16. To enable this adjustability and removability of the adjustable section 43, the underside of the fixed section 43′ is provided with a tracks or ways 360 on each side thereof. One side of each of the ways has a plurality of, in this case five, openings or bores 362 for the reception of locking pins 363. Rollers 364 are rotatably mounted on pins 366 suitably fixed to the movable femoral part 43.

The locking pin 363 is normally pressed toward locking relation with one of the bores 362 by a spring 370 mounted in a recess which seats in a part of the casting and presses against a snap ring 365 mounted in a groove formed in the locking pin. A set screw 370′ enables adjustment of the locking pin 363. A fitting 367 is secured to the locking pin and receives an eccentric pin 368. The eccentric pin is eccentrically secured to a rotatable member 369 mounted on a shaft 371 which has a flat side. A bearing member 372 is located in a bore formed in a wall 374 formed on the underside of the removable section 43′. The bearing member 372 is fixed and the shaft rotates within it. A set screw 373 extending through the casting holds the bearing member against movement longitudinally and rotationally in the bore. The shaft 371 has a flat extension 376 which is secured in any suitable manner to the hand release piece 377. Upon loosening and resetting the set screw 370′, hand release piece 377 may be set as desired.

It will now be understood that upon moving the hand release piece, the shaft 371 will be rotated and the eccentric pin 368 will rotate to reciprocate the fitting 367. This action will withdraw the locking pin 363 against the action of spring 370 from the particular bore 362 in which it is seated. The movable section 43 may then be shifted with relation to the fixed section to the desired position as diagrammatically illustrated in FIG. 20. In FIG. 19 the movable spinal section 41 and the movable femoral section 43 have been superimposed over the fixed sections 41' and 43' respectively. In FIG. 20 the spinal and femoral sections have been extended their maximum distance. As will be apparent from FIG. 16, the movable femoral section 43 may be completely removed from the fixed section 43'. Similarly the movable spinal section 41 may be completely removed from the fixed spinal section 41'. A stop pin 375, stop plate 361' (FIG. 16) prevent unintended removal when extending the section. In order to remove the section the section has to be lightly lifted when the stop pin touches the stop plate.

The head rest section 39 is removable from the spinal section 41 as will presently appear. Thus the head rest section 39, the removable spinal section 41, the removable foot section 44 and the removable femoral section 43 may all be removed from the table leaving only the seat or pelvic section 42 and the short sections 41' and 43' articulated with respect to the pelvic sections. All the actuating elements previously described are operatively connected to these three sections.

Referring now to FIGS. 6A and 17, the head rest section 39 has been shown. The head rest 39 may be swung about a pivot 386 secured to an arm 387 the end of which is split at 388. The head rest assembly may pivot about a pivot 389 and be locked in any desired adjusted position. For this purpose the arm 387 is split at 391 and a hand operated clamp 392 opens and closes the gaps at 388 and 391, to release the head rest assembly to enable it to be shifted and locked in a desired adjusted position. The head rest, for example, may be shifted so that it hangs downward normal to the plane of spinal section 41 or at its other extreme rests on the spinal section either normal thereto or at a tilt angle. The single hand lever locks both clamps 388 and 391. The specific manner in which this is accomplished is old and well known and per se does not constitute part of the present invention.

As previously mentioned the headrest section is removable from the spinal section 41. This is illustrated in FIG. 17 (see also FIG. 6A). For this purpose attached to the arm 387 is a connecting piece 401 which has a bracket 402 secured thereto. The bracket 402 has two forks 403 rigidly secured thereto which fit into bores 404 formed in the underside of the spinal section 41. The forks are locked in the bores by hand clamps 406 the ends of which engage the forks. Within limits the headrest assembly may be shifted toward and away from the spinal section 41. The head rest assembly has side extensions 407 which carry side rails 408. The side rails are for the purpose of supporting an anesthetic screen assembly and for this reason are movable with the head rest.

The leg rest section 44 is releasably locked with respect to the movable part 43 of the femoral section. This locking means, located on the underside of the leg rest section, comprises a multiplicity of discs 408 and 409 only two of which have been shown. The discs 408 are splined to a casing 411 while the discs 409 are splined to a shaft or rod 412 as shown at 413.

A hand release lever 414 extends below the end of the leg rest section, is supported in any suitable manner and has adjustable stops 416. The inner end of the lever 414 is fitted to a cam 417 which has two flat spots 418 and 419. The cam 417 actuates a pair of pushrods 421 and 422 through rollers riding on the cams. The pushrods include threaded members 423 having nuts 424 thereon threaded into sockets in the pushrods. A U-shaped mounting 425 for slidably receiving the pushrods is supported from the leg rest section. A spring 426 coiled in a cage 427 carried by the leg rest section is extended and tied to the hand release lever 414 as shown at 428.

In the solid line position of the release lever 414, the cam is rotated from the position of FIG. 16 and the pressure of the spring and the action of the cam is such as to exert pressure on pressure members 430 rigidly connected to the threaded members 423. The force exerted on the pressure members 430 may be varied by adjusting the nuts 424.

The casing 411 is fixed to the leg rest section and rotates with it about the axis of the shaft 412. The shaft 412 is fixed to the slide member 353. When pressure is applied on the outer plate 408, the discs are free to shift and apply pressure between the discs 408 and 409 and since the shaft 412 is fixed in position, the casing 411 is rigidly held and the foot rest is locked in the desired adjusted position with respect to the movable part 43 of the femoral section.

To release the foot rest section the hand release lever is shifted to the dotted line position which frees the discs 408 and 409 from frictional engagement and permits rotation of the foot rest section about the axis of the shafts 412. When the leg rest section reaches the desired position of adjustment, the hand release lever is released and the spring 426 snaps the cam 417 to locking position to apply pressure on the discs and lock the leg rest in the adjusted position. The action is therefore a self-locking one. Moreover, because the locking mechanism is approximately on the axis of articulation, the leg rest section may be rotated through an arc of 180° or more. Angular locked positions of the leg rest with respect to the movable part 43 of the femoral section are shown in FIGS. 27 and 28.

While we have shown and described the preferred form of mechanism of our invention it will be apparent that various modifications and changes may be made therein, particularly in the form and relation of parts, without departing from the spirit of our invention as set forth in the appended claims.

We claim:

1. In a system for controlling a fluid-operated power system for a surgical table comprising, in combination, a base, a housing mounted on said base, means including a pump and motor mounted in said housing to provide a source of fluid under pressure, a fixture having a free end mounted for pivotal movement on said housing, a manifold fixed relative to said housing, conduit means for supplying fluid under pressure from said source of pressure fluid to said manifold, valves mounted on the free end of said fixture for movement upon movement of said fixture, and flexible fluid conduits interconnecting said manifold and said valves and arranged to permit relative movement therebetween.

2. A surgical table wherein a table top has a plurality of sections at least some of which are articulated with respect to each other comprising, in combination, means including a plurality of manually actuated controls for controlling the operation of said articulated sections, said controls being mounted in a cluster and being adapted for finger operation, a safety device independent of said controls mounted adjacent said cluster adapted to be depressed by the palm of the hand as the user brings his fingers into contact with one of said controls and means interrelating said safety device and said controls so that said controls are ineffective until said safety device has been depressed.

3. A surgical table in accordance with claim 2 in which a control arm is provided upon which said cluster and said safety device are mounted and means for swinging said control arm about a vertical axis through an arc of approximately 180°.

4. A surgical table in accordance with claim 2 in which a control arm is provided upon which said cluster and said safety device are mounted and means for swinging said control arm about a horizontal axis.

5. A surgical table in accordance with claim 2 in which a control arm is provided upon which said cluster and said safety device are mounted and means for swinging said control arm about a vertical axis through an arc of approximately 180° and means for swinging said arm about a horizontal axis.

6. A surgical table comprising, in combination, a table top having a plurality of sections some of which are articulated with respect to each other, a base upon which the table top is mounted, means for raising and lowering the table top with reference to the base and means for tilting the table top as a unit about both a lateral and a longitudinal axis, a casing enclosing a pump and motor mounted on said base, said casing having a fixed lower part having a vertical member defining an axis, a member having an arc of swing rotatable on said vertical axis, an arm having a free end secured to said member, manually operated means mounted on said arm at the free end thereof and means including valves and hydraulic circuits connecting said pump and valves for articulating said sections, raising and lowering the table top and tilting the table top.

7. A surgical table in accordance with claim 6 in which the arc of swing about said vertical axis is approximately 180°.

8. A surgical table in accordance with claim 6 in which means are provided for swinging said arm about a horizontal axis.

9. A surgical table comprising, in combination, a table top having a plurality of sections at least some of which are articulated with respect to each other, means for articulating said sections, means for swinging said table top about both a longitudinal and a transverse axis, means including a plurality of manually actuated controls for controlling said articulating means and said swinging means, said controls being grouped together remote from the table top and safety means including a manually actuated member which must be manually actuated before any of said manually actuated controls may be actuated and must be maintained in actuated condition in order to continue the operation of said controls.

10. A surgical table in accordance with claim 9 in which an arm having a free end is pivoted on a vertical axis carried by said casing and carries at its free end said controls and the manually actuated member of said safety means.

11. A surgical table wherein a table top has a plurality of sections at least some of which are articulated with respect to each other comprising, in combination, means including a hydraulic system for articulating said sections with respect to each other, means including a plurality of manually actuated controls for controlling said hydraulic system, a common control box, means for mounting said manually actuated controls on said common control box, a pump and motor assembly for said hydraulic system, an explosion proof casing having a vertical pivot for housing said pump and motor assembly and an arm for carrying said control box pivoted to swing about the vertical pivot on said casing.

12. A surgical table in accordance with claim 11 in which spring means are provided for counter-balancing the weight of the arm and control box.

13. A surgical table comprising, in combination, a table top having a plurality of table sections, power actuated means for articulating at least some of said sections with respect to each other, means including a plurality of manually actuated controls for controlling the operation of said articulating means, a safety device adapted to be depressed by the palm of the hand, said controls being closely spaced with respect to each other and with respect to said safety device so that all of said controls may be encompassed by the fingers when the palm of the hand is applied on said safety device to depress the same, means interrelating said safety device and said controls to prevent actuation of any of said controls until said safety device has been depressed and means for stopping the operation of said articulating means upon release of said safety device from its depressed condition.

14. A surgical table in accordance with claim 13 in which a control arm has a free end with said controls and safety device being mounted on the free end of said control arm in a position remote from the table perimeter, said control arm being rotatable about both a vertical and a horizontal axis.

15. A surgical table wherein a base supports a plurality of articulated table sections forming a table top and wherein the table top may be raised and lowered, swung about a longitudinal and transverse axis and at least some of said table sections may be power articulated comprising, in combination:
(a) a fluid operated power system for controlling said operations of the table;
(b) an explosion-proof casing mounted on said base;
(c) means including a pump and motor mounted in said casing to provide a source of fluid under pressure;
(d) a fixture having a free end mounted for pivotal movement about a vertical axis carried by said casing;
(e) a plurality of valves mounted on the free end of said fixture;
(f) a manifold fixed relative to said casing; and
(g) flexible fluid conduit means extending from said valves, through said fixture to said manifold and being adapted to coil and uncoil around said vertical axis as said fixture is rotated.

16. A surgical table wherein a base supports a plurality of articulated table sections forming a table top and wherein the table top may be raised and lowered and swung about a longitudinal and transverse axis and at least some of said table sections may be power articulated comprising, in combination:
(a) a plurality of manually actuated controls for controlling the operation of said power operated system;
(b) a safety device separate from said manually actuated controls;
(c) means for conditioning said power operated system for operation when said safety device is manually actuated to move it from in inactive to an active position, said power operated system being maintained in operation so long as said safety device is manually maintained in active position, and said manually actuated controls being ineffective to initiate the operation of said power operated system to perform any of the functions of the table until said safety device is actuated; and
(d) means for interrupting the operation of said power operated system upon release of said safety device from its active position.

17. A surgical table in accordance with claim 16 wherein said manually actuated controls are grouped together in a position remote from the table top; and said safety device is adjacent said controls in a position such that said safety device and the desired one of said controls may be operated with one hand.

18. A surgical table in accordance with claim 16 wherein a fixture is mounted on said base upon which said controls and safety device are mounted, and means for rotating said fixture manually about a vertical axis.

19. A control system for an articulated sectional surgical table comprising, in combination:
(a) a hydraulic system including a pump and motor for articulating at least some of the sections of said table, raising and lowering of the table and tilting the table;
(b) means including a plurality of hand controlled valves for initiating the action of said hydraulic system;
(c) safety means for starting the motor when said safety means is moved manually from an inactive position to an active position, said hand control valves being ineffective until said safety means is moved to the active position; and
(d) means for automatically restoring said safety means to the inactive position and stopping the motor upon release of said safety means from manual control.

20. A control system in accordance with claim 19 in which the safety means includes a manually operated member, a switch for controlling the starting and stopping of the motor, and hydraulic means between said manually operated member and said switch.

21. A surgical table wherein a base supports a plurality of articulated table sections forming a table top and wherein the table top may be raised and lowered and swung about a longitudinal and transverse axis and at least some of said table sections may be power articulated comprising, in combination:
   (a) a control unit having a plurality of controls;
   (b) means actuated by said controls for articulating said sections, raising and lowering the table, and pivoting the table about said transverse and longitudinal axes; and
   (c) an arm supporting said control unit at a position remote from the periphery of the table top, said arm being pivoted on a horizontally extending pivot to enable the control unit to be raised and lowered independently of the table top.

22. A surgical table wherein a base supports a plurality of articulated sections forming a table top and wherein the table top may be raised and lowered with reference to the base, swung about both a longitudinal and transverse axis and at least some of the sections may be power articulated comprising, in combination:
   (a) a fluid operated power system for controlling said operation of the table;
   (b) an explosion-proof casing mounted on said base;
   (c) a pump and motor mounted in said casing to provide a source of fluid under pressure;
   (d) a plurality of finger actuated hydraulic controls grouped in a cluster, one of said finger actuated controls being associated with each of the operations of the table and said controls being ineffective unless the motor is operating;
   (e) a safety device normally maintained in an inoperative position and manually movable to an operative position;
   (f) means including connections between said safety device and said motor for starting the motor upon actuation of said safety device; and
   (g) means for restoring said safety device to an inoperative position upon release of said safety device from manual control.

23. A surgical table in accordance with claim 22 in which an arm having a free end is mounted on said casing, is movable about both horizontal and vertical pivots and carries said cluster and safety device on the free end thereof.

References Cited by the Examiner

UNITED STATES PATENTS

| | | | |
|---|---|---|---|
| 1,306,536 | 6/19 | Hall | 200—9 |
| 1,343,232 | 6/20 | Simmon | 200—9 |
| 1,544,751 | 7/25 | Haynes et al. | 268—64 |
| 1,569,589 | 1/26 | Stocker | 60—52 XR |
| 2,172,941 | 9/39 | Manning et al. | 311—7 |
| 2,217,783 | 10/40 | Bell | 311—7 |
| 2,447,968 | 8/48 | Trotter | 121—38 XR |
| 2,456,277 | 12/48 | Heitz-Boyer | 311—7 XR |
| 2,520,455 | 8/50 | Clachko | 311—7 |
| 2,571,829 | 10/51 | Buckley | 311—7 |
| 2,764,459 | 9/56 | McDonald | 311—7 |
| 2,794,694 | 6/57 | Fulwood et al. | 311—7 |
| 2,812,848 | 11/57 | Yaggi | 198—139 |
| 2,920,747 | 1/60 | Barrett | 198—139 |
| 3,046,071 | 7/62 | Shampaine et al. | 311—7 |

FOREIGN PATENTS

| | | |
|---|---|---|
| 452,994 | 9/36 | Great Britain. |
| 1,054,664 | 4/59 | Germany. |
| 1,249,620 | 2/60 | France. |

FRANK SUSKO, *Primary Examiner.*

EDWARD V. BENHAM, FRANK B. SHERRY,
*Examiners.*